(12) United States Patent
Horiike

(10) Patent No.: US 7,446,442 B2
(45) Date of Patent: Nov. 4, 2008

(54) STEPPING MOTOR AND DRIVE DEVICE

(75) Inventor: Kaori Horiike, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 11/103,454

(22) Filed: Apr. 12, 2005

(65) Prior Publication Data
US 2005/0236914 A1    Oct. 27, 2005

(30) Foreign Application Priority Data

Apr. 21, 2004 (JP) ............................. 2004-125276
Feb. 3, 2005 (JP) ............................. 2005-027869

(51) Int. Cl.
*H02K 37/00* (2006.01)

(52) U.S. Cl. .................... 310/49 R; 310/257

(58) Field of Classification Search .................. 310/49, 310/49 R, 194, 156.08, 261; 242/130.2
See application file for complete search history.

(56) References Cited

U.S. PATENT DOCUMENTS

| | | | | |
|---|---|---|---|---|
| 2,919,079 | A * | 12/1959 | Winslow | 242/130.2 |
| 5,969,453 | A * | 10/1999 | Aoshima | 310/156.12 |
| 6,157,107 | A * | 12/2000 | Aoshima et al. | 310/156.2 |
| 6,201,324 | B1 | 3/2001 | Suzuki et al. | 310/57 |
| 6,713,936 | B2 * | 3/2004 | Lee | 310/257 |
| 6,798,093 | B2 * | 9/2004 | Aoshima | 310/49 R |
| 7,071,593 | B2 * | 7/2006 | Matsushita et al. | 310/257 |
| 7,173,351 | B2 * | 2/2007 | Ogawa | 310/49 R |
| 2003/0107274 | A1 * | 6/2003 | Lee | 310/49 R |
| 2004/0124719 | A1 | 7/2004 | Aoshima et al. | 310/49 R |

FOREIGN PATENT DOCUMENTS

| | | |
|---|---|---|
| JP | 6-237551 | 8/1994 |
| JP | 2003-9497 | 1/2003 |
| JP | 2003-009501 | 1/2003 |
| JP | 2003-70224 | 3/2003 |

* cited by examiner

*Primary Examiner*—Tran Nguyen
(74) *Attorney, Agent, or Firm*—Fitzpatrick, Cella, Harper & Scinto

(57) ABSTRACT

A stepping motor includes a rotatable cylindrical magnet circumferentially divided to be alternately magnetized with different magnetic poles, a first coil and a second coil disposed in positions where the first coil and the second coil are concentric with the magnet and hold the magnet therebetween from both axial ends, and a first cylindrical stator and a second cylindrical stator each having a tooth-shaped magnetic pole portion axially extending to face the magnet. In addition, a cylindrical bobbin is made of an insulator and on which at least one of the first coil and the second coil is wound. The bobbin includes an engaging portion engaged with the axially extending magnetic pole portion such that a predetermined positional relation is established between relative circumferential positions of the first stator and the second stator.

8 Claims, 15 Drawing Sheets

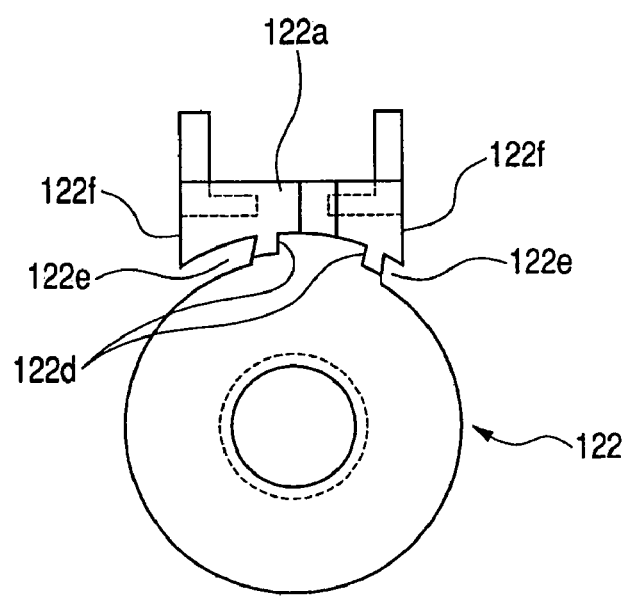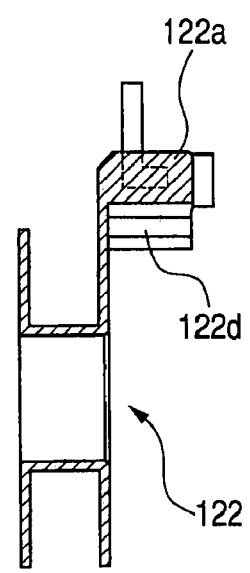
FIG. 15A (PRIOR ART)
FIG. 15B (PRIOR ART)

STEPPING MOTOR AND DRIVE DEVICE

BACKGROUND OF THE INVENTION

1. Field of the Invention

The present invention relates to a stepping motor used for a device driving source or the like, and a drive device as a stepping motor.

2. Related Background Art

Japanese Patent Application Laid-Open No. 2003-9497 discloses a subminiature stepping motor for aligning phases of stators with each other on a bobbin terminal base. FIG. 14 is an exploded perspective view of the proposed stepping motor.

In FIG. 14, reference numeral 111 denotes a magnet multipolar-magnetized in a circumferential direction, and 112 a shaft, which constitute a rotor 110. Two sets of stators of similar configurations are provided as stators 120 opposed to the rotor 110, and arranged in both ends of the magnet 111 in an axial direction so as to face each other. The stator 120 includes an inner yoke 121, a coil bobbin 122, an outer yoke 123, and a cylindrical member 124 for magnetically and mechanically connecting inner-diameter sides of the inner and outer yokes 121 and 123. The coil bobbin 122 is made of an insulator such as a resin, and a bobbin terminal base 122a is located on its outer peripheral side. The inner and outer yokes 121 and 123 are both made of magnetic materials, and tooth-shaped magnetic pole portions 121b and 123b thereof face an outer peripheral surface of the magnet 111. The magnetic pole portion 123b of the outer yoke 123 is arranged in a position having a phase difference of an electrical angle of 180° with respect to the magnetic pole portion 121b of the inner yoke 121. It is the bobbin terminal base 122a of the coil bobbin 122 that regulates relative positions of the magnetic pole portions 123b and 121b. This construction will be described by referring to FIGS. 15A and 15B.

FIG. 15A is a view of the coil bobbin 122 seen from an axial direction, and FIG. 15B a sectional view of the coil bobbin 122. Stator regulation portions 122d and 122e are disposed in the bobbin terminal base 122a of the coil bobbin 122. The stator regulation portion 122d is engaged with the magnetic pole portion 121b of the inner yoke 121, and the stator regulation portion 122e is engaged with the magnetic pole portion 123b of the outer yoke 123. By these engagements, the inner and outer yokes 121 and 123 are positioned with respect to the coil bobbin 122, and the inner and outer yokes 121 and 123 are correctly held in positions of electrical angles of 180° to each other.

In the stepping motor of the aforementioned construction, a rotational direction position between the two sets of stators 120 must be set in a position of a predetermined angle (usually an electrical angle of 90°). Accordingly, an opening 131a of a motor case 131 is engaged with a yoke regulation portion 122f disposed in the bobbin terminal base 122a, and a position of the yoke regulation portion 122f is set so as to form predetermined shifting angles with respect to the stator regulation portions 122d and 122e, whereby a phase difference is created between the two stators 120. Thus, positioning is facilitated, achieving enhanced ease of assembly.

As another conventional example, Japanese Patent Application Laid-Open No. 2003-70224 discloses a stepping motor in which two sets of stators is positioned by different components. FIG. 16 is an exploded perspective view of the stepping motor.

In FIG. 16, reference numeral 303 denotes a first magnetic unit which includes a stator (inner and outer magnetic pole portions) facing a magnet, and a coil for exciting the stator, these components being covered with resin to be integrated together. Similarly, reference numeral 304 denotes a second magnetic unit which includes a stator (inner and outer magnetic pole portions) facing the magnet, and a coil for exciting the stator, these components being covered with a resin to be integrated together. Reference numeral 301 denotes a magnet, 302 a shaft having the magnet 301 fixed thereto for rotatably holding the magnet 301, and 305 and 306 bearings.

In the stepping motor of the aforementioned construction, the magnet 301 is held between the two magnetic units, namely the first and second magnetic units 303 and 304, from both ends. Specifically, this stepping motor is constructed as a cylindrical motor by butting the first and second magnetic units 303 and 304 each covered with a resin against each other to be integrated together. A portion having a shape of a pin, a projection, or the like, is disposed in the butted portion to enable positioning, with their respective outer magnetic pole portions maintaining predetermined angles, and then an adhesive resin is applied on the butted portion, and hardened and fixed.

Meanwhile, in many cases, compact cylindrical stepping motors are structured in such a manner that, to facilitate power feeding to the coil for exciting the stator, a terminal base equipped with a terminal pin is disposed in the bobbin around which coil wire is wound, a terminal of the coil wire is wound on the terminal pin, and a flexible printed circuit (hereinafter abbreviated as FPC) or the like is electrically connected to the terminal base.

In subminiature stepping motors having a small outer diameter, the terminal base is also formed small. Accordingly, measures are taken to overcome problems caused by loads applied to the terminal base and the FPC when the FPC or the like is connected to the terminal base. In other words, many proposals have been made about contrivances for preventing the FPC falling-off from the terminal base or the terminal base from being damaged, and contrivances utilizing the protruding configuration of the terminal base from the motor outer peripheral surface.

In FIG. 16, in the first and second magnetic units 303 and 304, terminal bases 307 and 308 are integrally formed with bobbins (not shown), respectively. The terminal bases 307 and 308 are arranged with flanges of the bobbins extending and protruding from the motor outer peripheral surface, and respectively support terminals 307a and 308a for winding lead wires of the coils wound on the bobbins. Members 309 and 310 made of resins are additionally disposed in the terminal bases 307 and 308, respectively.

The first and second magnetic units 303 and 304 are disposed so that their longitudinal (axial) ends face each other, and the resin members 309 and 310 are disposed between the terminal bases 307 and 308, whereby the terminal bases 307 and 308 are increased in strength. Accordingly, it is possible to prevent the terminal bases 307 and 308 from being destructed due to an external force applied thereto when the FPC or the lead wire of the coil is connected to the terminal bases 307 and 308.

There has been proposed a technique for preventing an FPC from being disconnected due to an external force (e.g., Japanese Patent Application Laid-Open No. H6-237551).

FIG. 17 is a sectional view showing a construction of a spindle motor disclosed in Japanese Patent Application Laid-Open No. H6-237551.

In FIG. 17, the spindle motor is a motor used for rotationally driving a floppy (registered trademark) disk or the like, and includes a spindle 401, a rotor 402, a coil 403, a stator portion 404, a base 405, a sleeve 406, an FPC 407, and a reinforcing member 408.

The FPC 407 on which a power supply circuit or the like for feeding power to the coil 403 is mounted includes a through-hole 407a, and the sleeve 406 disposed in the stator portion 404 is inserted into the through-hole 40-7a. The reinforcing member 408 is disposed below a fixing portion 407b of the FPC 407, and the reinforcing member 408 is pressed and fixed onto the sleeve 406. The above structure, in which the FPC 407 is fixed to the stator portion 404 through the reinforcing member 408, enables fixing of the FPC 407 with sufficient strength. Accordingly, even when an external force is applied to the FPC 407, there is no fear of the FPC 407 being damaged or the fixed portion being destroyed.

However, in the stepping motor shown in FIG. 14, the alignment of the inner and outer yokes 121 and 123 is carried out directly by the bobbin terminal base 122a, and thus assembly can be very accurate. However, the phase alignment between the two sets of stators 120 is carried out in such a manner that phases of the stators 120 are aligned with each other through the two stages of alignment between the coil bobbin 122 and the stator 120 and alignment between the coil bobbin 122 and the motor case 131, and the dimensional accuracy of phase alignment between the stators 120 is not really high in consideration of component tolerances and the like. Thus, the use of another member (corresponding to the motor case 131) provided with the regulation portion for aligning the phases of the stators with each other by one component causes problems of an increase in the number of components, complex component construction, and the like.

In the stepping motor shown in FIG. 16, the positioning is not so accurate because it is carried out by the resin which covers the exterior of the stepping motor. However, as compared with the stepping motor shown in FIG. 14, the accuracy is higher because the motor case is not interposed. Moreover, since the motor case component itself is not necessary, the stepping motor has an advantage that the number of components can be reduced and assembly is easy. However, there is a disadvantage of increased costs because insert molding for covering the stator or the coil with the resin is necessary.

The stepping motor shown in FIG. 16 employs the structure of filling the portion between the terminal bases, to which the FPC or the like is connected, with the resin, thereby contributing to the reinforcement of the terminal bases themselves. However, there is a fear of falling-off of the FPC from the terminal base when an external force is applied to the FPC or the like. Besides, because of the largely protruding configuration of the terminal base itself from the motor outer peripheral portion, miniaturization is impossible.

Furthermore, the motor shown in FIG. 17 employs the structure in which the sleeve is inserted into the through-hole of the FPC and the reinforcement is provided by the reinforcing member, whereby destruction is not liable to occur even when an external force is applied to the FPC. However, when the structure of FIG. 17 is applied to a two-phase compact cylindrical motor similar to the stepping motor shown in FIG. 16, the two coils are arranged in separate positions on the same axis in FIG. 16, and thus arrangement similar to the structure of FIG. 17 is structurally difficult.

SUMMARY OF THE INVENTION

A first object of the present invention is to provide a stepping motor capable of achieving higher precision by aligning first and second stators with each other in a circumferential direction by one component.

A second object of the present invention is to provide a high precision stepping motor capable of reducing the number of components, achieving enhanced ease of assembly, and realizing low costs by aligning first and second stators with each other in a circumferential direction by one component and protecting each stator and a magnet from the outside by this component.

A third object of the present invention is to provide a highly reliable drive device capable of preventing problems of destruction of a substrate itself, disconnection of an electrical connection portion between the substrate and the drive device side, and the like even when an external force is applied to the substrate.

To attain the first object, according to an embodiment of the present invention, there is provided a stepping motor including: a rotatable cylindrical magnet circumferentially divided to be alternately magnetized to different poles; a first coil and a second coil arranged in positions where the first coil and the second coil are concentric with the magnet and hold the magnet therebetween from both axial ends; a first cylindrical stator and a second cylindrical stator each having a tooth-shaped magnetic pole portion axially extending to face the magnet; and a cylindrical bobbin made of an insulator on which at least one of the first coil and the second coil is wound, in which the bobbin includes an engaging part engaged with the axially extending magnetic pole portion such that a predetermined positional relation is established between relative circumferential positions of the first stator and the second stator.

To attain the second object, according to an embodiment of the present invention, there is provided a stepping motor including: a rotatable cylindrical magnet circumferentially divided to be alternately magnetized to different poles; a first coil and a second coil arranged in positions where the first coil and the second coil are concentric with the magnet and hold the magnet therebetween from both axial ends; a first cylindrical stator and a second cylindrical stator each having a tooth-shaped magnetic pole portion axially extending to face the magnet; and a cylindrical bobbin made of an insulator on which at least one of the first coil and the second coil is wound, in which the bobbin includes an engaging part engaged with the axially extending magnetic pole portion such that a predetermined positional relation is established between relative circumferential positions of the first stator and the second stator, and a cover that covers outer peripheral sides of the first stator, the second stator, and the magnet.

To attain the first object, according to an embodiment of the present invention, there is provided a stepping motor including: a rotatable cylindrical magnet circumferentially divided to be alternately magnetized to different poles; a first cylindrical coil and a second cylindrical coil arranged in positions where the first cylindrical coil and the second cylindrical coil are concentric with the magnet and axially hold the magnet therebetween; a first stator having a first outer magnetic pole portion axially extending to face one outer peripheral surface side of the magnet at a predetermined interval and excited by the first coil; a second stator having a second outer magnetic pole portion axially extending to face the other outer peripheral surface side of the magnet and excited by the second coil; an output shaft having an inner magnetic pole portion made of a soft magnetic material and fixed to an inner diameter portion of the magnet, the inner magnetic pole portion facing at least one of the first outer magnetic pole portion and the second outer magnetic pole portion within a predetermined axial range and excited by at least one of the first coil and the second coil; and a cylindrical bobbin made of an insulator on which at least one of the first coil and the second coil is wound, in which the bobbin includes an engaging part engaged with the axially extending first magnetic pole portion and the axially extending second magnetic pole portion such that a predetermined positional relation is established between relative circumferential positions of the first stator and the second stator.

To attain the second object, according to an embodiment of the present invention, there is provided a stepping motor including: a rotatable cylindrical magnet circumferentially divided to be alternately magnetized to different poles; a first cylindrical coil and a second cylindrical coil arranged in positions where the first cylindrical coil and the second cylindrical coil are concentric with the magnet and axially hold the magnet therebetween; a first stator having a first outer magnetic pole portion axially extending to face one outer peripheral surface side of the magnet at a predetermined interval and excited by the first coil; a second stator having a second outer magnetic pole portion axially extending to face the other outer peripheral surface side of the magnet and excited by the second coil; an output shaft having an inner magnetic pole portion made of a soft magnetic material and fixed to an inner diameter portion of the magnet, the inner magnetic pole portion facing at least one of the first outer magnetic pole portion and the second outer magnetic pole portion within a predetermined axial range and excited by at least one of the first coil and the second coil; and a cylindrical bobbin made of an insulator on which at least one of the first coil and the second coil is wound, in which the bobbin includes an engaging part engaged with the axially extending first magnetic pole portion and the axially extending second magnetic pole portion such that a predetermined positional relation is established between relative circumferential positions of the first stator and the second stator, and a cover that covers outer peripheral sides of the first stator, the second stator, and the magnet.

With this construction, it is possible to provide a stepping motor capable of achieving improved precision by aligning the first and second stators with each other in the circumferential direction by one component.

Moreover, with this construction, it is possible to provide a high precision stepping motor capable of reducing the number of components, achieving enhanced ease of assembly, and realizing low costs by aligning the first and second stators with each other in the circumferential direction by one component and protecting each stator and the magnet from the outside by this component.

To attain the third object, according to another embodiment of the present invention, there is provided a drive device including: a magnetized cylindrical magnet; a rotary shaft fixed to an inner diameter portion of the magnet; a first coil arranged on one axial side of the magnet to be coaxial with the magnet; a second coil arranged on the other axial side of the magnetic to be coaxial with the magnet; a first stator arranged to face an outer peripheral surface of the magnet and excited by the first coil; and a second stator arranged to face the outer peripheral surface of the magnet and excited by the second coil, in which the first stator and the second stator each include an engaging part, and in which the first stator and the second stator, and a substrate for feeding power to the first coil and the second coil, are fixed to each other through the engaging part.

With this construction, the structure is employed in which the engaging portions are disposed in the first and second stators, and the first and second stators and the substrate for feeding power to the coils are fixed to each other through the engaging parts, and thus the substrate can be fixed with sufficient strength. Accordingly, it is possible to provide a highly reliable drive device capable of preventing problems of destruction of the substrate itself, disconnection of the electrical connection portion between the substrate and the drive device side, and the like even when an external force is applied to the substrate. Moreover, the first and second stators can be easily positioned in the rotational axis direction, assembly can be facilitated, and low costs can be realized.

Further, according to another preferred embodiment of the present invention, the first stator and the second stator, and the substrate, are fixed to each other such that a predetermined positional relation is established between relative positions of the first stator and the second stator with respect to a rotational direction of the magnet.

With this construction, the first and second stators and the substrate are fixed to each other so that the predetermined positional relation can be established between the relative positions of the first and second stators with respect to the rotational direction of the magnet. Accordingly, it is possible to provide a high rotational performance drive device capable of improving relative position accuracy of the first and second stators.

Further, according to another preferred embodiment of the present invention, a method of fixing the first stator and the second stator to the substrate preferably includes soldering.

With this construction, the fixing is easy because the first and second stators and the substrate are fixed to each other by soldering.

Further, according to another preferred embodiment of the present invention, the first stator includes a first outer magnetic pole portion of a comb-tooth shape axially extending to face an outer peripheral surface on one axial end surface side of the magnet; the second stator includes a second outer magnetic pole portion of a comb-tooth shape axially extending to face an outer peripheral surface on the other axial end surface side of the magnet; and the rotary shaft includes a first inner magnetic pole portion facing the first outer magnetic pole portion with the magnet therebetween, and a second inner magnetic pole portion facing the second outer magnetic pole portion with the magnet therebetween.

With this construction, the outer magnetic pole portions of the first and second stators are formed into the axially extending comb-tooth shapes. Accordingly, it is possible to limit an outer diameter of the drive device to a minimum, thereby miniaturizing the drive device.

Further, according to another preferred embodiment of the present invention, the drive device further includes: a first bobbin on which the first coil is wound; and a second bobbin on which the second coil is wound, the first bobbin including a terminal pin for connecting a terminal of the first coil, the terminal pin being disposed in a portion axially extending from the coil wound portion, the second bobbin including a terminal pin for connecting a terminal of the second coil, the terminal pin being disposed in a portion axially extending from the coil wound portion.

With this construction, the terminal pins are arranged in the portions axially extending from the coil winding portions of the first and second bobbins for interconnecting the terminals of the first and second coils. Accordingly, as compared with the conventional drive device of the structure in which the terminal base and the terminal pin radially protrude from the outer diameter portion, an outer diameter of the drive device can be minimized, making it possible to miniaturize the drive device.

Further, according to another preferred embodiment of the present invention, energization directions to the first coil and the second coil are sequentially switched, and the magnet is sequentially rotated to positions corresponding to energization phases.

The above and other objects, features, and advantages of the invention will become more apparent from the following detailed description taken in conjunction with the accompanying drawings.

BRIEF DESCRIPTION OF THE DRAWINGS

FIGS. 15A and 15B are block diagrams each showing details of a coil bobbin of the stepping motor of FIG. 14;

DESCRIPTION OF THE PREFERRED EMBODIMENTS

Hereinafter, the present invention will be described in detail with reference to the accompanying drawings.

A stepping motor and a drive device of the present invention will be described below by way of First to Third Embodiments.

First Embodiment

Figure 1:
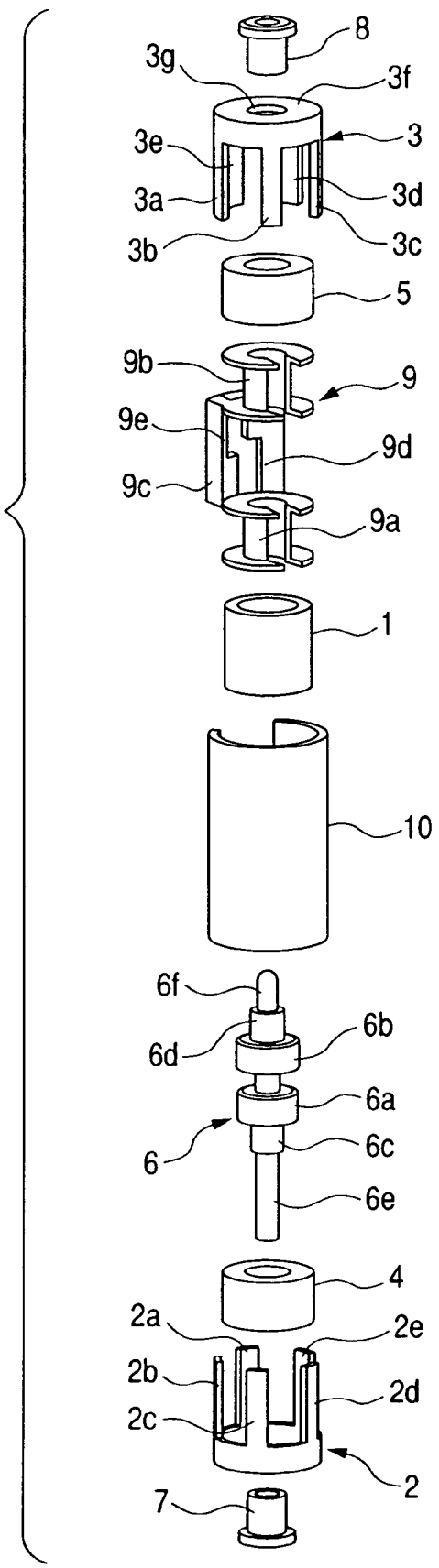
FIG. 1 is an exploded perspective view showing a stepping motor according to First Embodiment of the present invention.
Figure 2:
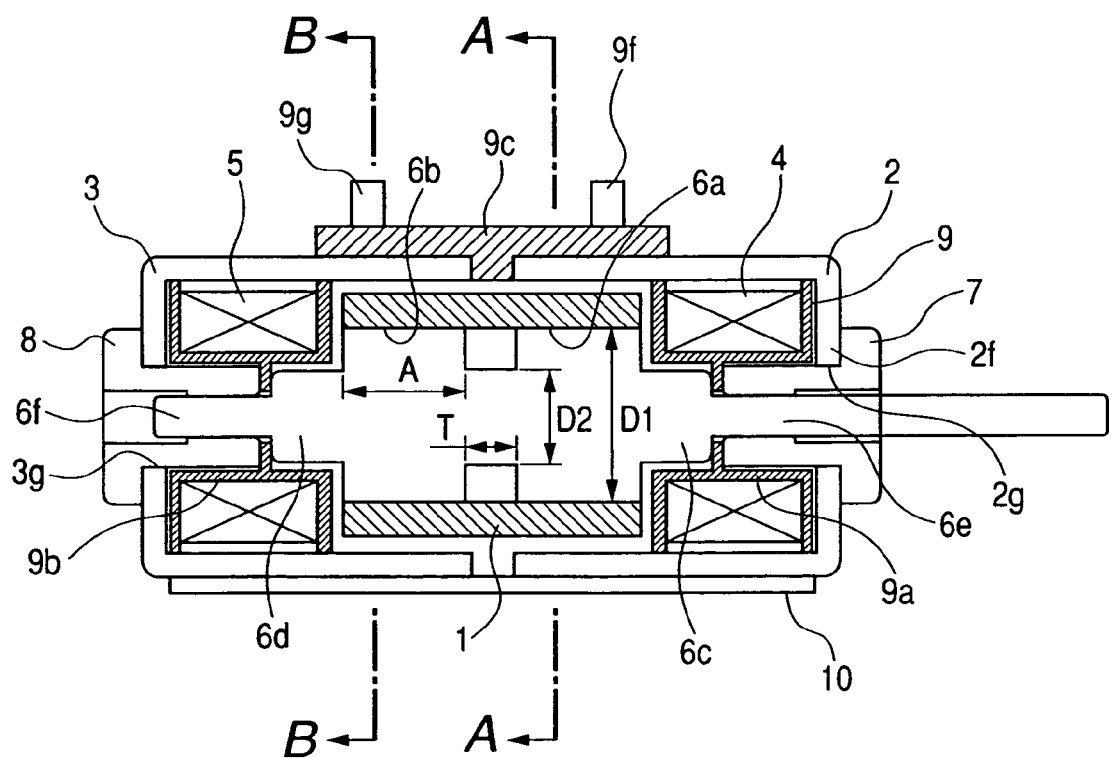
FIG. 2 is a sectional view of an assembling completed state of the stepping motor of FIG. 1.

FIGS. 1 and 2, and FIGS. 3A to 3H are views of First Embodiment of the present invention: FIG. 1 is an exploded perspective view of a stepping motor, and FIG. 2 is a sectional view of the stepping motor of FIG. 1 in an axial direction after assembled.

Referring to FIGS. 1 and 2, reference numeral 1 denotes a magnet of a cylindrical shape having a magnetization portion in which its outer peripheral surface is divided into n portions (n=10 according to First Embodiment) in a circumferential direction, and the portions are alternately magnetized to south and north poles. Reference numeral 2 denotes a first stator made of a soft magnetic material and including a doughnut-shaped top board 2f having a hole 2g bored in an outer cylinder and a center. The outer cylinder of the first stator 2 includes first outer magnetic pole portions 2a to 2e formed in the tip portion to extend in the axial direction, and the first outer magnetic pole portions 2a to 2e are formed at intervals of 720/n degrees (72° according to First Embodiment) in the circumferential direction. Reference numeral 3 denotes a second stator made of a soft magnetic material and including a doughnut-shaped top board 3f having a hole 3g bored in an outer cylinder and a center. The outer cylinder of the second stator 3 includes second outer magnetic pole portions 3a to 3e formed in the tip portion to extend in the axial direction, and the second outer magnetic pole portions 3a to 3e are formed at intervals of 720/n degrees (72° in First Embodiment) in the circumferential direction.

The first and second outer magnetic pole portions 2a to 2e and 3a to 3e of the first and second stators 2 and 3 have tooth shapes extending in a direction parallel with the axis. With this construction, a magnetic pole portion can be formed while limiting a diameter of the stepping motor to a minimum. In other words, if the outer magnetic pole portions are formed into concave and convex shapes extending in a radial direction, the diameter of the motor is accordingly increased. According to the First Embodiment, however, the outer magnetic pole portions are formed into the tooth shapes extending in the direction parallel with the axis, and thus the diameter of the motor can be limited to a minimum.

Reference numeral 4 denotes a first cylindrical coil wound on a bobbin 9 (described later). An outer diameter of the first coil 4 is almost equal to that of the magnet 1. Reference numeral 5 denotes a second cylindrical coil similarly wound on the bobbin 9 (described later). An outer diameter of the second coil 5 is also almost equal to that of the magnet 1.

Reference numeral 6 denotes a rotary shaft made of a soft magnetic material, inserted into inner diameter portions of the first and second coils 4 and 5, and fixed to an inner diameter portion of the magnet 1 by an adhesive. This rotary shaft 6 includes a first inner magnetic pole portion 6a with an outer diameter D1 in a position to hold the magnet 1 within an axial range facing the first outer magnetic pole portions 2a to 2e of the first stator 2 opposed to the magnet 1. Portions 6c and 6e of the rotary shaft 6 are inserted into the inner diameter portion of the first coil 4, and the first inner magnetic pole portion 6a is excited to a pole opposed to that of the first outer magnetic pole portions 2a to 2e by energizing the first coil 4. A sectional shape vertical to an axis of the first inner magnetic pole portion 6a is circular as shown in FIGS. 3A to 3H.

Similarly, the rotary shaft 6 includes a second inner magnetic pole portion 6b with an outer diameter D1 in a position to hold the magnet 1 within an axial range facing the second outer magnetic pole portions 3a to 3e of the second stator 3 opposed to the magnet 1. Portions 6d and 6f of the rotary shaft 6 are inserted into the inner diameter portion of the second coil 5, and the second inner magnetic pole portion 6b is excited to a pole opposed to that of the second outer magnetic pole portions 3a to 3e by the second coil 5. A sectional shape vertical to an axis of the second inner magnetic pole portion 6b is circular as in the case of the first inner magnetic pole portion 6a.

An outer diameter of a portion (connected portion indicated by T in FIG. 2) held between the first and second inner magnetic pole portions 6a and 6b is represented by D2, in which D1>D2 is established. As D2 is small, the outer diameter D2 works to set high magnetic resistance between the first and second inner magnetic pole portions 6a and 6b. Accordingly, a magnetic flux generated by energizing the first coil 4 is prevented from affecting the second coil 5, the second outer magnetic pole portions 3a to 3e, and the second inner magnetic pole portion 6b through the rotary shaft 6 made of the soft magnetic material. Similarly, a magnetic flux generated by energizing the second coil 5 is prevented from affecting the first coil 4, the first outer magnetic pole portions 2a to 2e, and the first inner magnetic pole portion 6a through the rotary shaft 6 made of the soft magnetic material, thereby realizing stable rotation. The shaft portion 6e is fitted to a first bearing 7 (described later), and the shaft portion 6f is fitted to a second bearing 8 (described later), whereby the rotary shaft 6 is rotatably held.

The magnet 1 is fixed to the first or second inner magnetic pole portion 6a or 6b of the rotary shaft 6. Thus, mechanical strength of the magnet 1 increases because its inner diameter is filled with the first and second inner magnetic pole portions 6a and 6b. The first and second inner magnetic pole portions 6a and 6b work as back metals, and a permeance modulus of the magnetic circuit is set high, whereby magnetic deterioration caused by demagnetization is reduced even in use under a high-temperature environment.

The first bearing 7 is made of a soft magnetic material, and fixed by the hole 2g of the first stator 2. Accordingly, the first bearing 7 and the first stator 2 are magnetically connected to each other. An inner diameter portion of the first bearing 7 is fitted to the shaft portion 6e of the rotary shaft 6 to rotatably hold the rotary shaft 6, and the first bearing 7 and the rotary shaft 6 are magnetically connected to each other in this fitted portion. Thus, the first stator 2 and the rotary shaft 6 are magnetically connected to each other through the first bearing 7, facilitating a flow of the magnetic flux generated by the first coil 4.

The second bearing 8 is made of a soft magnetic material, and fixed by the hole 3g of the second stator 3. Accordingly, the second bearing 8 and the second stator 3 are magnetically connected to each other. An inner diameter portion of the second bearing 8 is fitted to the shaft portion 6f of the rotary shaft 6 to rotatably hold the rotary shaft 6, and the second bearing 8 and the rotary shaft 6 are magnetically connected to each other in this fitted portion. Thus, the second stator 3 and the rotary shaft 6 are magnetically connected to each other through the second bearing 8, facilitating a flow of the magnetic flux generated by the second coil 5.

The bobbin 9 is formed by resin molding on which the first and second coils 4 and 5 are wound. The first coil 4 is wound on an outer periphery of a cylindrical portion 9a of the bobbin 9, and a coil end is hooked to a terminal 9f disposed in a bobbin terminal base 9c. Similarly, the second coil 5 is wound on an outer periphery of a cylindrical portion 9b of the bobbin 9, and a coil end is hooked to a terminal 9g disposed in the bobbin terminal base 9c. The bobbin terminal base 9c extends in the axial direction, and the cylindrical portions 9a and 9b are interconnected, which are constituted integrally.

With the aforementioned construction of the bobbin 9, the possibility of felling or damaging the bobbin terminal base 9c is reduced even when some force is applied. Engaging grooves 9d and 9e are disposed on an inner peripheral surface side of the bobbin terminal base 9c. The first outer magnetic pole portion 2a of the first stator 2 is fitted in the engaging groove 9d, and the second outer magnetic pole portion 3a of the second stator 3 is fitted in the engaging groove 9e. The engaging grooves 9d and 9e are disposed in positions shifted from each other by 180/n degrees (electrical angle of 90°) in the circumferential direction. Accordingly, the first and second outer magnetic pole portions 2a and 3a fitted in the engaging grooves 9d and 9e are positioned to be shifted from each other by 180/n degrees (electrical angle of 90°). For the bobbin 9, the cylindrical portion 9b on which the second coil 5 is wound and the terminal portion may be constituted of different components.

Reference numeral 10 denotes a cover for covering the components, which is inexpensive because the portion of the bobbin terminal base 9c is notched, and a round flat plate can be used to constitute the cover. Assembling is performed by inserting the first and second stators 2 and 3 from both ends of the cover 10 in the axial direction. The cover 10 is made of a nonmagnetic plate material, and configured to make difficult influences of both magnetic pole portions by disconnecting the magnetic circuit between the first and second stators 2 and 3.

Figure 14:
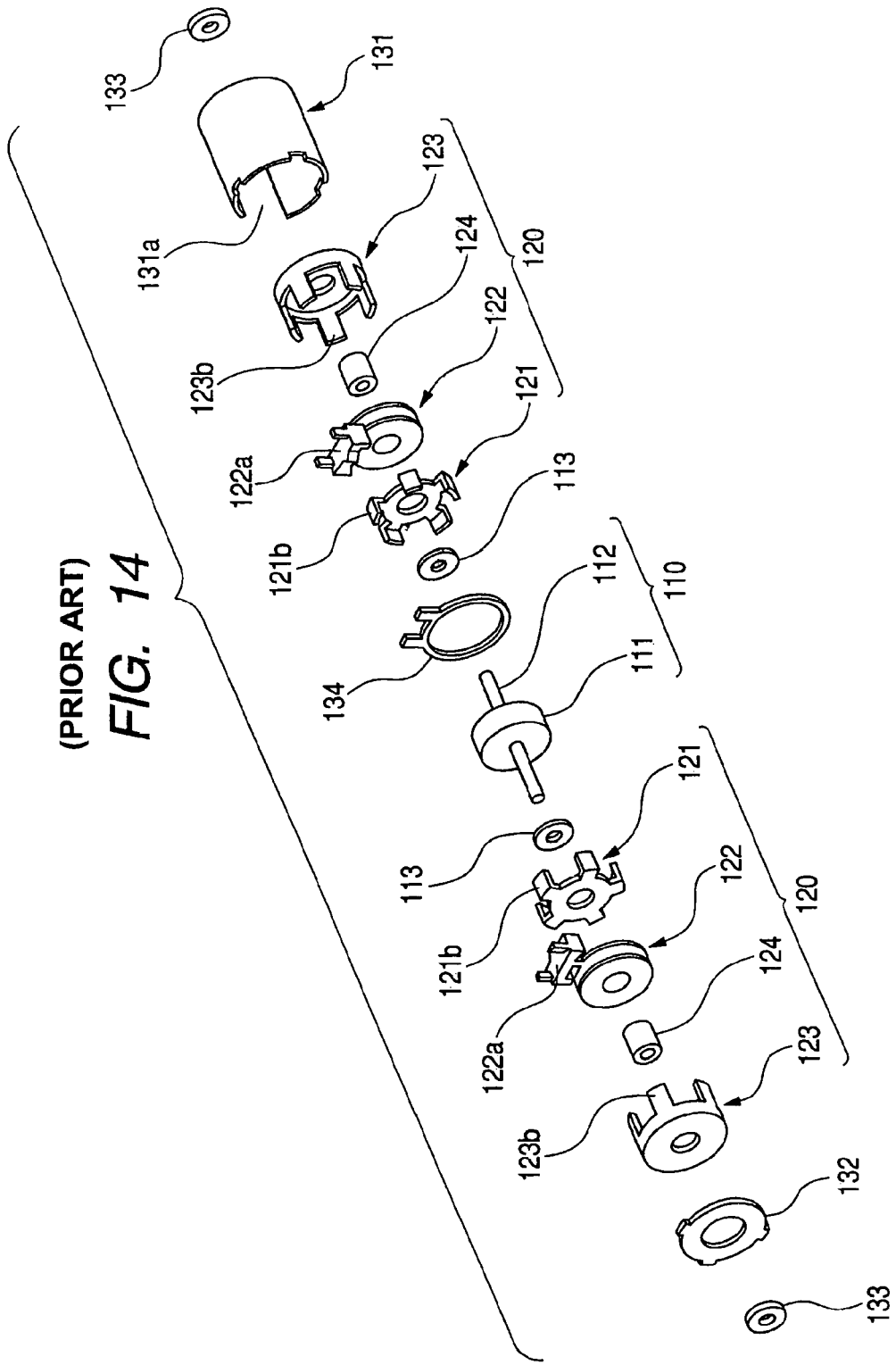
FIG. 14 is an exploded perspective view showing a conventional stepping motor.

In the stepping motor (FIG. 14) disclosed in Japanese Patent Application Laid-Open No. 2003-009497, the bobbin and the first stator are first regulated by the positioning unit disposed in the bobbin, and then the engaging portion disposed in the bobbin is engaged with the cover. The same process is carried out for the second stator. As a result, the first and second stators are positioned. In this case, a position error between the first and second stators is managed based on two sets of tolerance between the engaging grooves disposed in the bobbin, fitting tolerance between the engaging grooves and the stators, and fitting tolerance between the stator regulation portion on the bobbin and the cover, i.e., an error in which a double number of tolerances are integrated. Thus, the position error is large between the stators, and accuracy is not high. In the small-size compact stepping motor, an error especially by this tolerance has a large influence, greatly affecting rotational accuracy. On the other hand, according to First Embodiment of the present invention, with the foregoing construction, the relative position error between the first and second stators 2 and 3 is managed based on only tolerance between the engaging grooves 9d and 9e disposed in the bobbin 9 and fitting tolerance between the engaging grooves 9d and 9e and the first and second outer magnetic pole portions 2a and 3a, and thus positioning accuracy is much higher. Additionally, the engaging portions (engaging grooves) for positioning the two sets of first and second stators 2 and 3 are disposed in the bobbin 9 formed by molding using the resins. Thus, the engaging portions can be integrally formed, expending no extra costs.

Figure 3A:
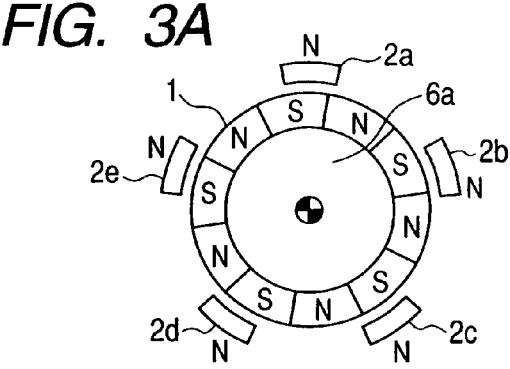
FIGS. 3A, 3B, 3C and 3D are sectional views taken along the line A-A of FIG. 2 for illustrating driving of the stepping motor of First Embodiment of the present invention.
Figure 3E:
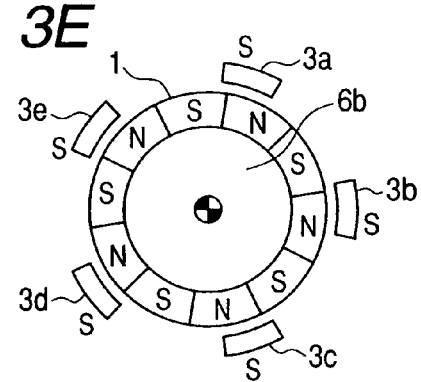
FIGS. 3E, 3F, 3G and 3H are sectional views taken along the line B-B of FIG. 2 for illustrating driving of the stepping motor of First Embodiment of the present invention.
Figure 3B:
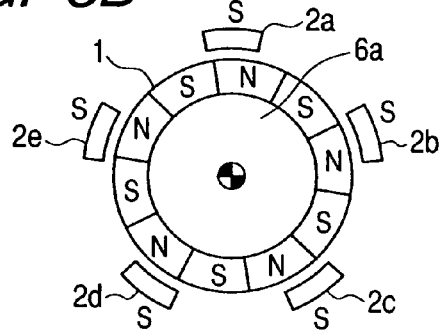
Figure 3F:
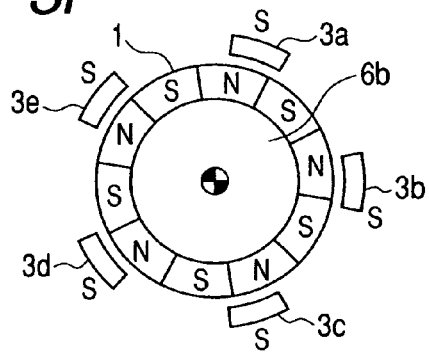
Figure 3C:
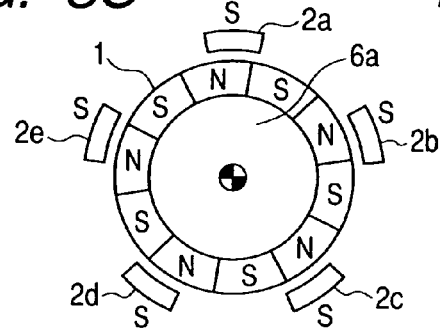
Figure 3G:
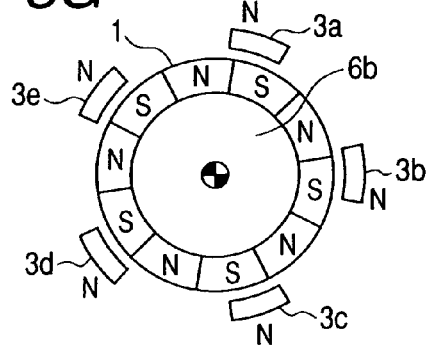
Figure 3D:
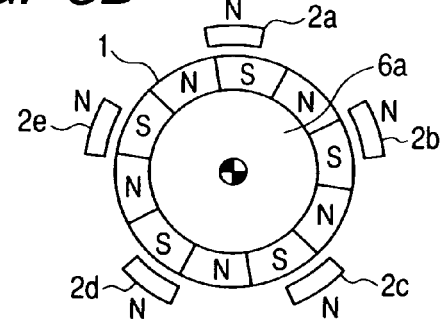
Figure 3H:
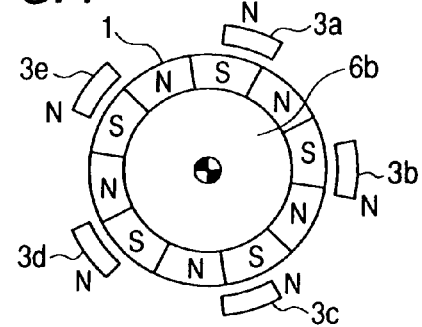

FIGS. 3A to 3D are sectional views taken along the line A-A of FIG. 2, and FIGS. 3E to 3H are sectional views taken along the line B-B of FIG. 2. Referring to these figures, drive of the stepping motor of First Embodiment will be described in detail. It is to be noted that FIGS. 3A and 3E are sectional views of the same time, FIGS. 3B and 3F are sectional views of the same time, FIGS. 3C and 3G are sectional views of the same time, and FIGS. 3D and 3H are sectional views of the same time.

FIGS. 3A and 3E show states in which the first and second coils 4 and 5 are energized to excite the first outer magnetic pole portions 2a to 2e to north poles and the second outer magnetic pole portions 3a to 3e to south poles. From these states, the energization of the first coil 4 is reversed to excite the first outer magnetic pole portions 2a to 2e to south poles while maintaining the second outer magnetic pole portions 3a to 3e excited at the south poles. Then, the magnet 1 is rotated counterclockwise by 18°, realizing states shown in FIGS. 3D and 3F.

Next, the energization of the second coil 5 is reversed to excite the second outer magnetic pole portions 3a to 3e to north poles while maintaining the first outer magnetic pole portions 2a to 2e excited at the south poles. Then, the magnet 1 is further rotated counterclockwise by 18°, realizing states shown in FIGS. 3C and 3G. Next, the energization of the first coil 4 is reversed to excite the first outer magnetic pole portions 2a to 2e to north poles while maintaining the second outer magnetic pole portions 3a to 3e excited at the north poles. Then, the magnet 1 is further rotated counterclockwise by 18°, realizing states shown in FIGS. 3D and 3H. Next, the energization of the second coil 5 is reversed to excite the second outer magnetic pole portions 3a to 3e to south poles while maintaining the first outer magnetic pole portions 2a to 2e excited at the north poles. Then, the magnet 1 is further rotated counterclockwise by 18°.

Thereafter, by similarly switching the energization directions of the first and second coils 4 and 5 in sequence, the magnet 1 is rotated to positions sequentially in accordance with energization phases. In this case, if there is a relative position error between the first and second outer magnetic pole portions 2a to 2e and 3a to 3e, not only the obtained torque is not strong enough but also stopping accuracy is accordingly reduced, causing individual differences. As a result, motor performance declines. In the stepping motor (FIG. 14) disclosed in Japanese Patent Application Laid-Open No. 2003-009497, the first and second stators are aligned with each other through another component (motor cover). As a result, a position error between the first and second stators is enlarged. On the other hand, according to First Embodiment, the first and second stators 2 and 3 are aligned with each other by disposing the engaging portions (engaging grooves 9d and 9e) in the bobbin terminal base 9c, and the alignment of the first and the second stators 2 and 3 with each other is completed within one component. Thus, a size error is small, and relative positions of both are set with high accuracy. As a result, deterioration of driving performance caused by the position error of the two stators is limited, realizing a high-performance stepping motor. Moreover, the bobbin 9 is made of an insulator and formed by resin molding. Thus, the bobbin 9 is not magnetically connected between the first and second outer magnetic pole portions 2a and 3a, and is easily moldable while being provided with regulation grooves.

The stepping motor of the aforementioned construction has the following features.

The magnetic flux generated by the first coil 4 passes between the first outer magnetic pole portions 2a to 2e facing the outer peripheral surface of the magnet 1 and the first inner magnetic pole portion 6a of the rotary shaft 6 fixed to the inner peripheral surface of the magnet 1. Accordingly, the magnetic flux is more effectively applied on the magnet 1 than that in the stepping motor (FIG. 14) disclosed in Japanese Patent Application Laid-Open No. 2003-009497. Similarly, the magnetic flux generated by the second coil 5 passes between the second outer magnetic pole portions 3a to 3e facing the outer peripheral surface of the magnet 1 and the second inner magnetic pole portion 6b of the rotary shaft 6 fixed to the inner peripheral surface of the magnet 1. Accordingly, the magnetic flux is effectively applied on the magnet 1. In this case, no air gap is necessary between the first and second inner magnetic pole portions 6a and 6b of the rotary shaft 6 facing the inner peripheral surface of the magnet 1. Thus, a distance between the outer and inner magnetic pole portions can be shortened, and magnetic resistance can be reduced, thereby increasing an output.

The first and second inner magnetic pole portions 6a and 6b are integrally formed by one rotary shaft 6. Thus, as compared with the stepping motor in which the outer and inner magnetic pole portions are provided as separate components, the stepping motor according to the above-described configuration can be easily manufactured, costs less, and is easily assembled.

Furthermore, since the rotary shaft 6 is fixed to the inner diameter portion of the magnet 1, not only the strength of the magnet 1 is high, but also there is no danger of deformation by heat. Magnetic deterioration of the magnet 1 is limited because the rotary shaft 6 works as the back metal.

As apparent from the foregoing, according to First Embodiment, the stepping motor is high in output, and driving performance and stopping accuracy are high while costs are low.

Second Embodiment

Figure 4:
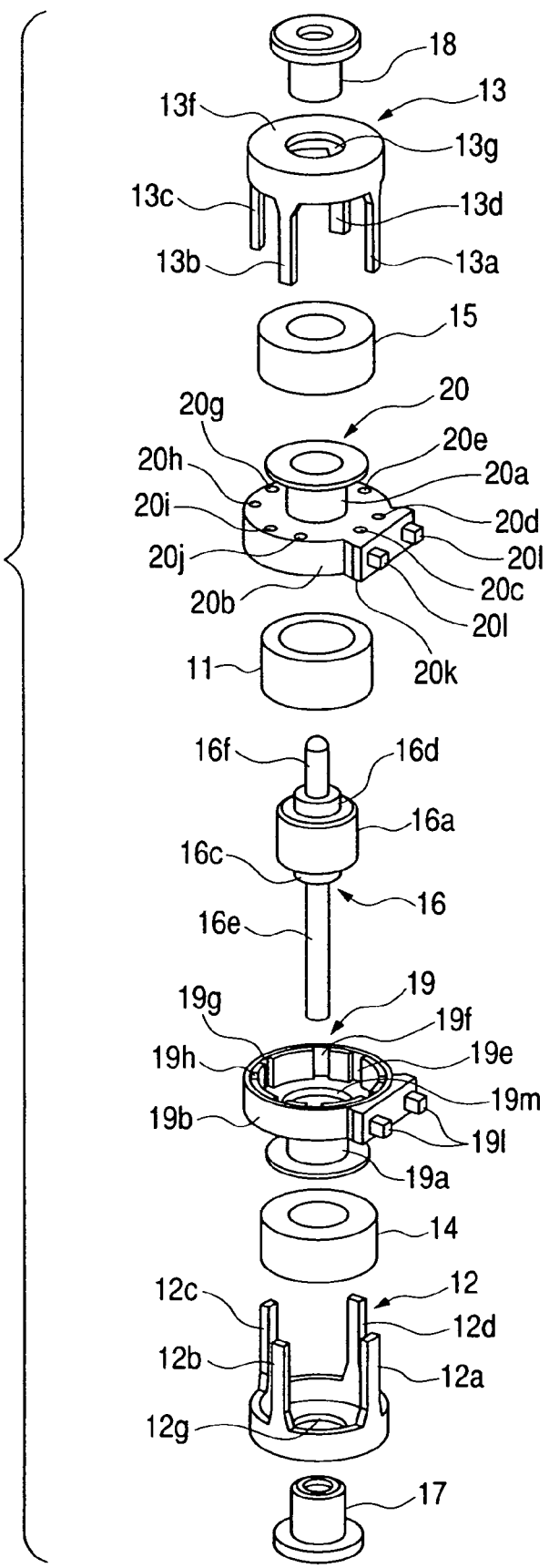
FIG. 4 is an exploded perspective view showing a stepping motor according to Second Embodiment of the present invention.
Figure 5:
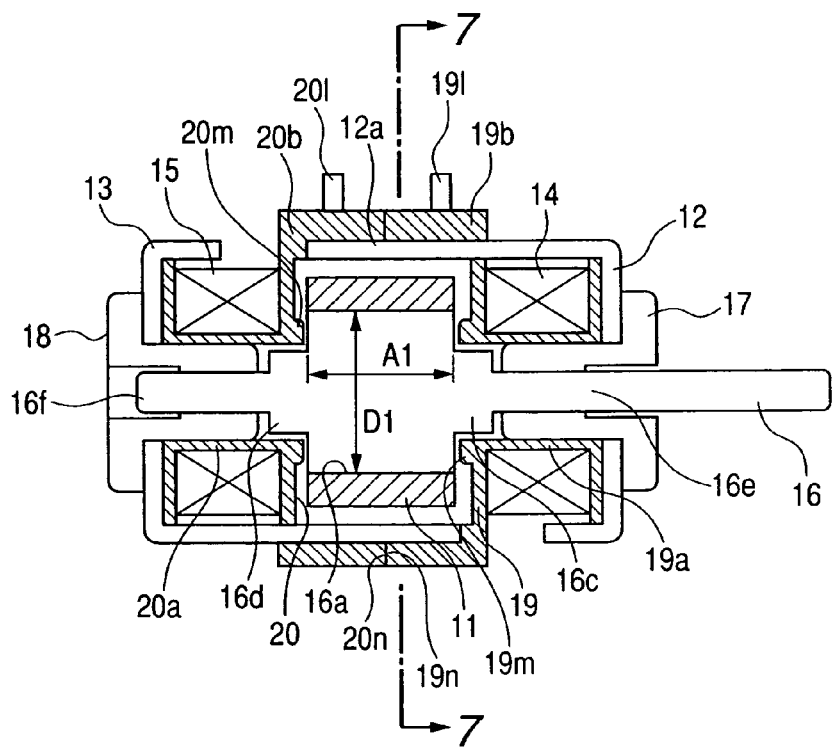
FIG. 5 is a sectional view of an assembling completed state of the stepping motor shown in FIG. 4.
Figure 6A:
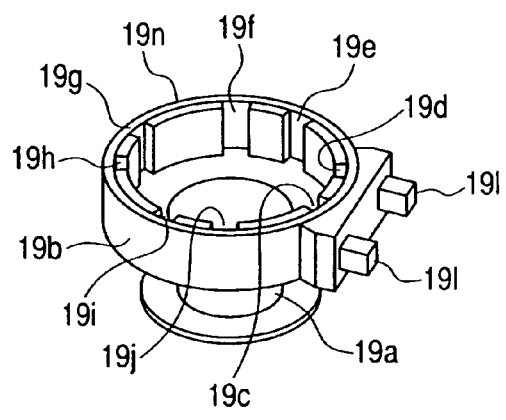
FIGS. 6A and 6B each show details of a bobbin which is a component of the stepping motor shown in FIG. 4.
Figure 6B:
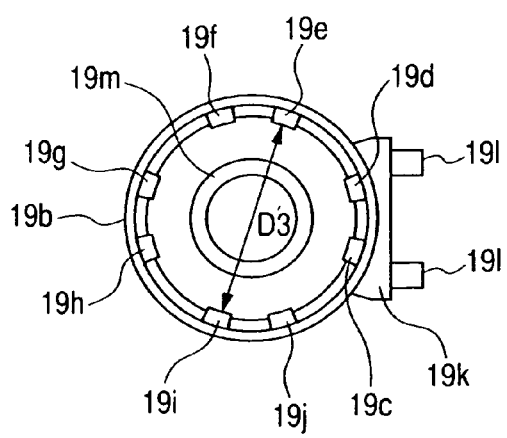
Figure 7:
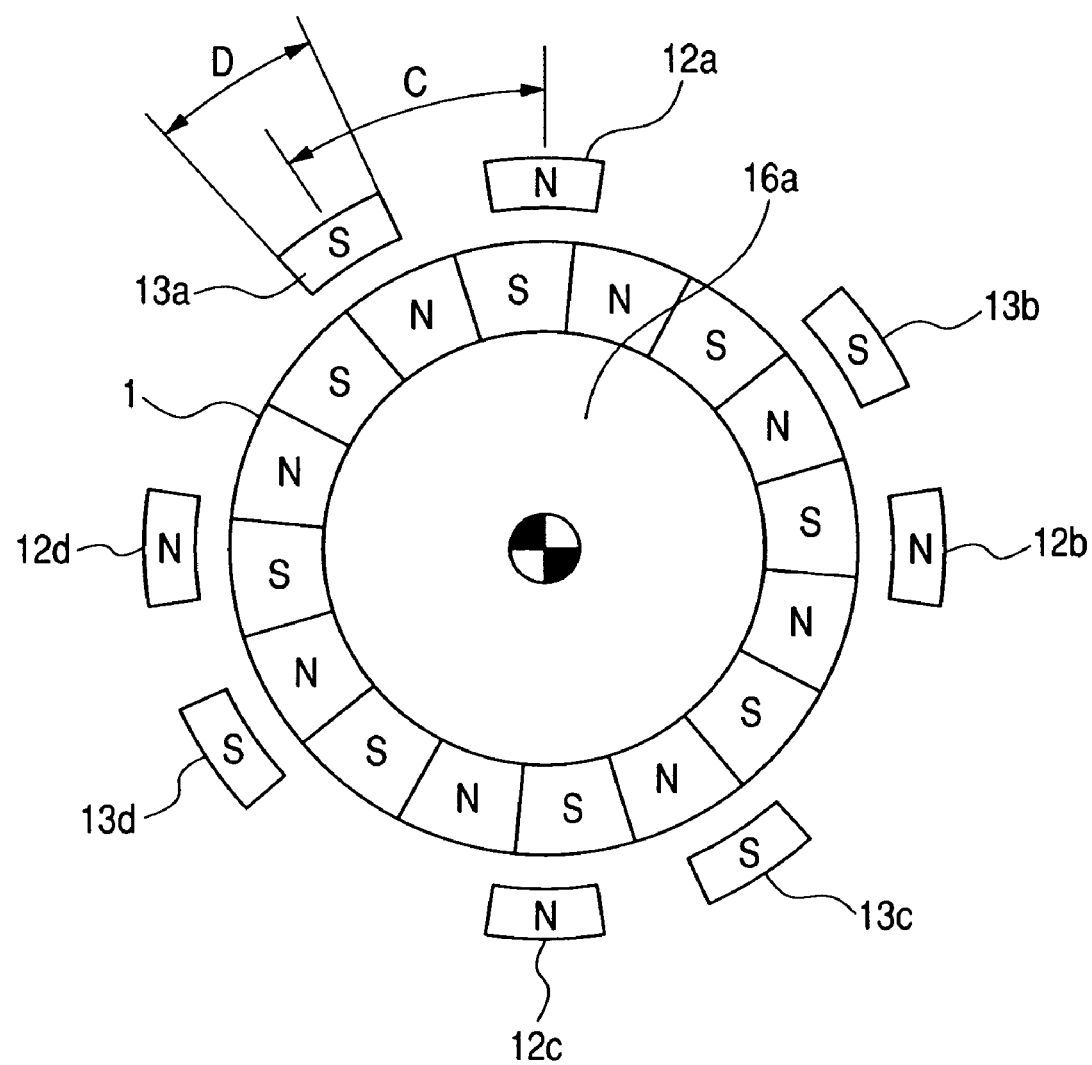
FIG. 7 is a sectional view taken along the line 7-7 of FIG. 5.

FIGS. 4 to 7, and FIGS. 8A to 8D are views of Second Embodiment of the present invention: FIG. 4 is an exploded perspective view of a stepping motor according to Second Embodiment, FIG. 5 is a sectional view of the stepping motor of FIG. 4 taken along an axial direction after its assembling, FIGS. 6A and 6B are block diagrams each showing details of a bobbin which is a component of the stepping motor shown in FIG. 4, and FIG. 7 is a sectional view taken along the line 7-7 of FIG. 5.

Throughout these figures, reference numeral 11 denotes a magnet of a cylindrical shape in which its outer peripheral surface is divided into 4×n portions, in which the number is an integral multiple of 4 at equal intervals in a circumferential direction (n is an integer, n=4 and thus the number of divisions is 16 according to Second Embodiment), and the portions are alternately magnetized to south and north poles; 14, a first cylindrical coil; and 15, similarly a second cylindrical coil. Centers of the coils are both coincident with a center of the magnet 11, and the coils are disposed to align in an axial direction and arranged in positions to hold the magnet 11 therebetween. Outer diameters of the first and second coils 14 and 15 are almost equal to that of the magnet 11. These first and second coils 14 and 15 are wound on bobbins 19 and 20 (described later).

Reference numeral 12 denotes a first stator; and 13, a second stator, both of which are made of soft magnetic materials, and have cylindrical outer cylindrical portions. The first stator 12 includes first outer magnetic pole portions 12a to 12d formed to face an outer peripheral surface of the magnet 11 at predetermined air gaps. The plurality of outer magnetic pole portions 12a to 12d are formed through circumferential division by notching a tip of the outer cylindrical portion of the first cylindrical stator 12, and each has a tooth shape extended from one end surface of the magnet 11 in the axial direction. Then, the first outer magnetic pole portions 12a to 12d are formed by being shifted at 360/n degrees, i.e., 90°. The second stator 13 similarly includes second outer magnetic pole portions 13a to 13d formed to face the outer peripheral surface of the magnet 11 at predetermined air gaps. The plurality of second outer magnetic pole portions 13a to 13d are formed through circumferential division by notching a tip of the outer cylindrical portion of the second cylindrical stator 13, and each has a tooth shape extended from another end surface of the magnet 11 which is opposed to that of the first stator 12 in the axial direction. Then, the second outer magnetic pole portions 13a to 13d are also formed by being shifted at 360/n degrees, i.e., 90°.

The first stator 12 is excited by the first coil 14, while the second stator 13 is excited by the second coil 15. The first and second outer magnetic pole portions 12a to 12d and 13a to 13d of the first and second stators 12 and 13 are similar in shape, and arranged on the outer peripheral surface of the magnet 11 to overlap each other with respect to a position parallel with an axis of the magnet 11 in a direction in which the tips of the magnetic pole portions of comb-tooth shapes face each other. The first and second outer magnetic pole portions 12a to 12d and 13a to 13d face the outer peripheral surface of the magnet 11 in all the axial length (size A portion in FIG. 5) of the magnet 11. The first and second stators 12 and 13 are arranged in a manner that phases of the tooth-shaped magnetic pole portions are shifted from each other by 135/n degrees, i.e., 33.75°. In FIG. 7, this angle is indicated by C.

Angle ranges (indicated by D in FIG. 7) per tooth of the magnetic pole portions of the comb-tooth shapes of the first and second stators 12 and 13 facing the magnet 11 are not greater than 360/(4×n), i.e., 22.5° or less. Centers of teeth (e.g., 12a and 13a) of the first and second outer magnetic pole portions of the first and second stators 12 and 13 are arranged to be shifted by 33.75°. Accordingly, even when the first and second outer magnetic pole portions 12a to 12d and 13a to 13d are similar in shape, and arranged on the outer peripheral surface of the magnet 11 to overlap each other with respect to the position parallel with the axis of the magnet 11 in the direction in which the tips of the magnetic pole portions of the comb-tooth shapes face each other, they can face the magnet 11 without being brought into contact with each other. Thus, no crosstalk occurs between the first and second outer magnetic pole portions 12a to 12d and 13a to 13d. As a result, no reduction occurs in rotational accuracy or rotational output.

Reference numeral 16 denotes a rotary shaft made of a soft magnetic material, and fixed to an inner diameter portion of the magnet 11. The rotary shaft 16 includes an inner magnetic pole portion 16a formed with an outer diameter D1 in a position to hold the magnet 11 within an axial range facing the first outer magnetic pole portions 12a to 12d of the first stator 2 opposed to the magnet 11. The second outer magnetic pole portions 13a to 13d are disposed to overlap the first outer magnetic pole portions 12a to 12d of the first stator 12 with respect to the position parallel with the axis of the magnet 11. Accordingly, the inner magnetic pole portion 16a faces both of the first and second outer magnetic pole portions 12a to 12d and 13a to 13d. A portion 16c of the rotary shaft 16 is inserted into the inner diameter portion of the first coil 14, and an angle range portion of the first inner magnetic pole portion 16a facing the first outer magnetic pole portions 12a to 12d is excited to a pole opposed to that of the first outer magnetic pole portions 12a to 12d by energizing the first coil 14. A sectional shape vertical to an axis of the inner magnetic pole portion 16a of the rotary shaft 16 is circular as shown in FIG. 7. Similarly, a portion 16d is inserted into the inner diameter portion of the second coil 15, and an angle range portion of the inner magnetic pole portion 16a facing the second outer magnetic pole portions 13a to 13d is excited to a pole opposed to that of the second outer magnetic pole portions 13a to 13d by energizing the second coil 15. The rotary shaft 16 fixes the magnet 11 by the inner magnetic pole portion 16a.

Reference numeral 17 denotes a first bearing made of a soft magnetic material, and fixed to the first stator 12 to rotatably hold a shaft portion 16e of the rotary shaft 16. Similarly, reference numeral 18 denotes a second bearing made of a soft magnetic material, and fixed to the second stator 13 to rotatably hold a shaft portion 16f of the rotary shaft 16. The first and second bearings 17 and 18 are both made of soft magnetic materials, and excited together with the inner magnetic pole portion 16a of the rotary shaft 16 by energizing the coils 14 and 15, constituting a magnetic circuit. Accordingly, magnetic resistance of the magnetic circuit is reduced as compared with a case in which bearings are made of nonmagnetic materials, increasing generated torque itself. However, there is a possibility that an adsorptive force will be generated between the rotary shaft 16 and the bearing to cause a torque loss by a frictional force, and to lose durability of a sliding surface. According to Second Embodiment, therefore, surfaces of the first bearing 17, the shaft portions 16e and 16f of the rotary shaft 16 and the second bearing 18 are subjected to lubricant coating, lubricant painting (fluorine, graphite, or molybdenum disulfide paint), lubricant plating (e.g., electroless nickel plating containing polytetrafluoroethylene (PTFE) or teflon (trademark) lubricating electroless nickel plating), or the like to suppress a torque loss caused by friction of the sliding surface and to prevent a loss of the durability of the sliding surface. Accordingly, the stepping motor with large output torque is realized.

Figure 16:
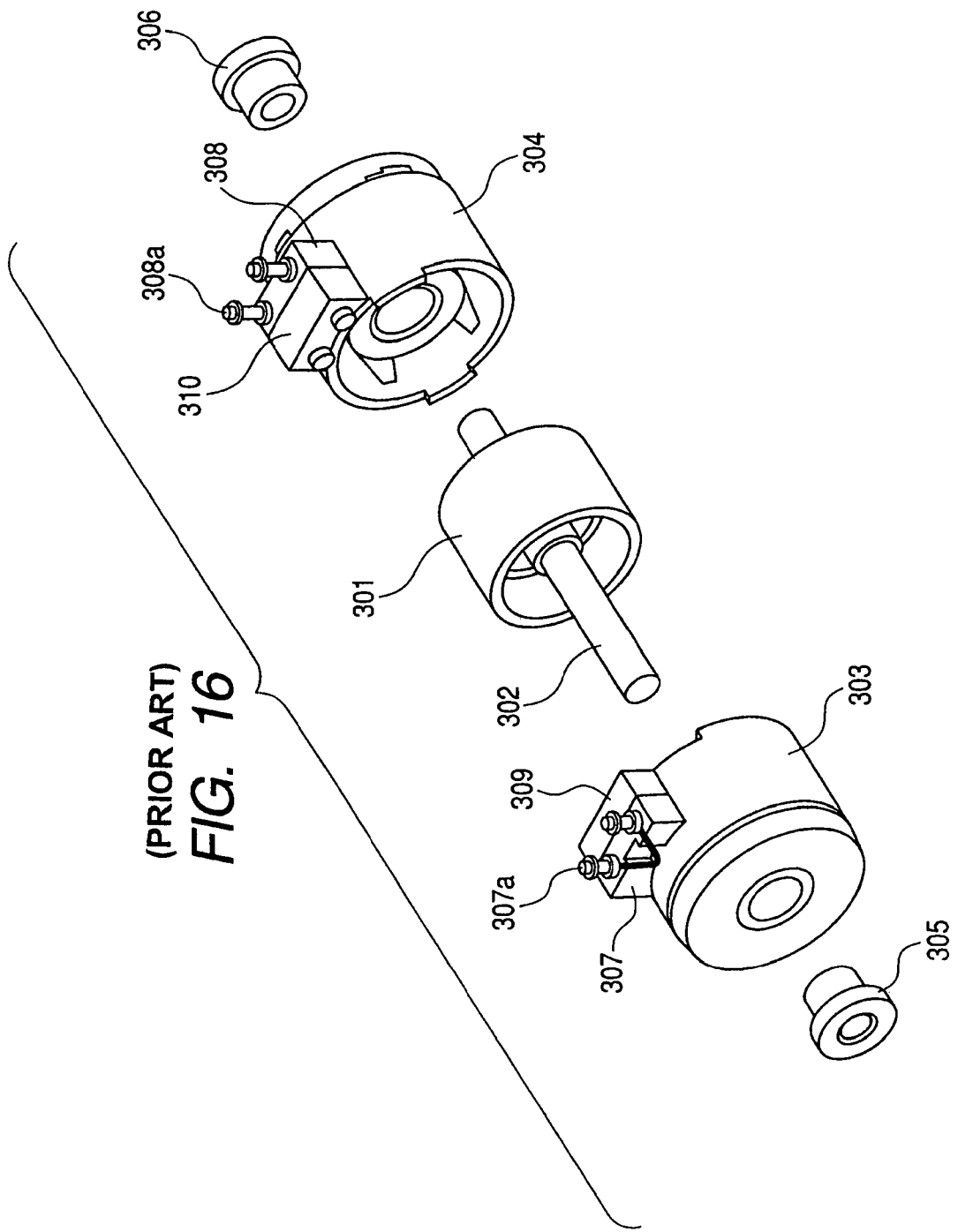
FIG. 16 is an exploded perspective view showing a construction of another conventional stepping motor.
Figure 17:
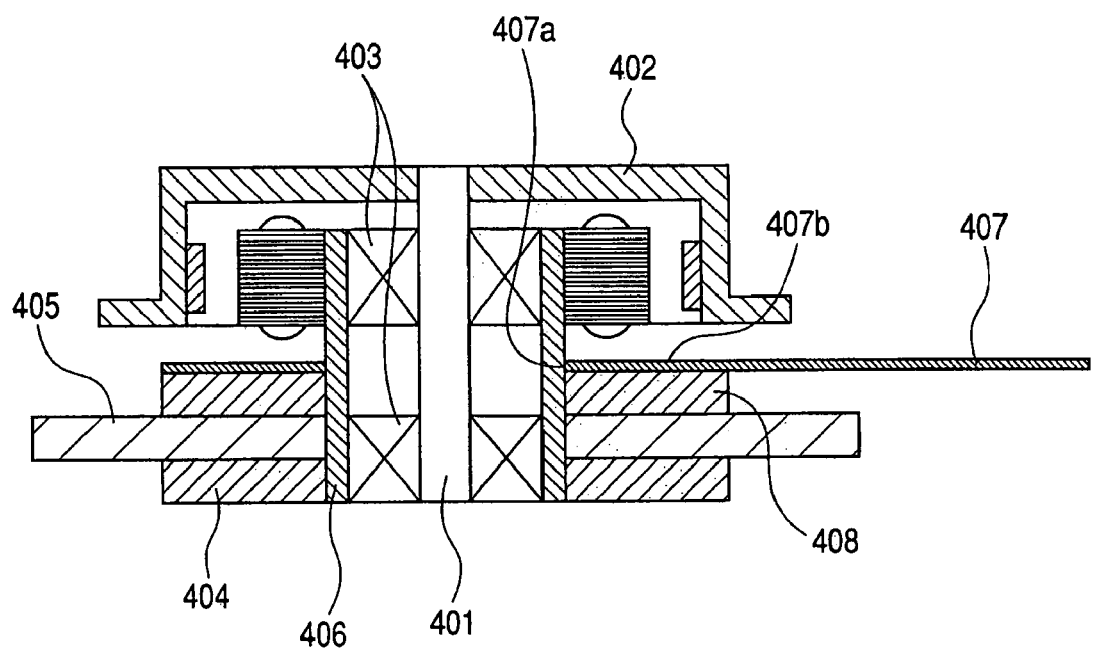
FIG. 17 is a sectional view showing a construction of another conventional spindle motor.

Reference numeral 19 denotes a bobbin made of an insulating material on which the first coil 14 is wound. FIG. 6A is a perspective view of the bobbin 19, and FIG. 6B a plan view of the same seen from the axial direction. The first coil 14 is wound on a cylindrical portion 19a, and coil ends are hooked to terminals 191 disposed in a bobbin terminal base 19k. A cover 19b is disposed to extend in a direction opposed to the cylindrical portion 19a on which the first coil 14 is wound. An inner diameter of the cover 19b is larger than an outer diameter of the magnet 11, and an outer diameter of the cover 19b is slightly larger than that of each stator. Position regulation grooves 19c to 19j are provided on an inner diameter side of the cover 19b. The bobbin 19 is inserted from a tooth tip side of the first outer magnetic pole portion 12a to be assembled by engaging the outer magnetic pole portion 12a of the first stator 12 with the position regulation groove 19c. In this case, the remaining first outer magnetic pole portions 12b to 12d are also inserted into the position regulation grooves 19i, 19g, and 19e, respectively. At this time, inner diameters (indicated by D3 in FIG. 16B) of the position regulation grooves 19i, 19g, and 19e are similar to those of the outer magnetic pole portions of each stator, whereby falling of the tooth tips of outer magnetic pole portions of each stator to the inside is prevented during assembling. Additionally, the assembling is carried out so that the first and second outer magnetic pole portions 12a to 12d and 13a to 13d of the first and second stators 12 and 13 extending in the axial direction face each other, and the outer magnetic pole portions 13a to 13d of the second stator 13 are engaged with the position regulation grooves 19d, 19f, 19h, and 19j of the bobbin 19 in this case.

As described above, the regulation grooves 19c and 19d, 19e and 19f, 19g and 19h, and 19i and 19j are disposed by predetermined rotational-direction phases, and the first and second outer magnetic pole portions 12a to 12d and 13a to 13d of the first and second stators 12 and 13 are engaged therewith to decide relative positions thereof. According to Second Embodiment, the predetermined rotational-direction phase means a position shifted by 135/n degrees, i.e., 33.75° (electrical angle 270°). A large relative phase error between the first and second stators 12 and 13 has effects of not only reducing the driving performance itself but also deteriorating the rotation accuracy. According to Second Embodiment, the phase management of the first and second stators 12 and 13 is directly carried out by the regulation groove 19c provided in the bobbin 19. Thus, accurate positioning is possible with only a small size error. As the bobbin 19 is formed by resin molding, the component provided with the regulation groove 19c is easily formed. The falling of the outer magnetic pole portions which is relatively easily bent is prevented by the regulation groove 19c and the other grooves 19e, 19g, and 19i into which the outer magnetic pole portions are inserted, and thus there is no danger of contact with the magnet 11. Moreover, since the terminal base 19k is disposed on the extension of the regulation groove 19b, there is no possibility of felling or damaging the terminal base 19k even if some force is applied to the terminal base 19k itself.

Reference numeral 20 denotes a second bobbin similar to the first bobbin 19. The second coil 15 is wound on a cylindrical portion 20a, and coil ends are hooked to terminals 201 disposed in a bobbin terminal base 20k. According to Second Embodiment, a shape similar to that of the first bobbin 19 is used for reducing costs. Thus, position regulation grooves 20c to 20j of the outer magnetic pole-portions of the stators are disposed in an inner-peripheral surface of a cover 20b. However, actual stator position is regulated by the first bobbin 19. Accordingly, no regulation grooves need to be disposed in the second bobbin 20, but it is only necessary to dispose eight grooves corresponding to the position regulation grooves 20c to 20j to prevent contact with the outer magnetic pole portions. As in the case of the first bobbin 19, however, an inner diameter portion of each groove is regulated to prevent falling of a tooth of the second outer magnetic pole portion of the second stator 13.

When the first and second bobbins 19 and 20 are assembled, the covers 19b and 20b face each other. In this case, upper end surfaces 19n and 20n of the covers 19b and 20b abut on each other to fix the bobbins together. The covers 19b and 20b are set to sizes to surround the magnet 11 and the outer magnetic pole portions of the stators 12 and 13 from the outer periphery. Accordingly, after the assembling, the magnet 11 and the first and second outer magnetic pole portions 12a to 12d and 13a to 13d are completely covered (not seen from the outside) with the bobbins 19 and 20. In other words, since a rotor (magnet or the like) easily affected by the outside (external force, dust intrusion, or the like), and the outer magnetic pole portions, which are easily deformed, of the stators are completely covered with the bobbins, a motor case is not necessary for this drive device, and it is possible to reduce component costs and assembling steps.

Projections 19m and 20m are disposed in end surfaces of the first and second bobbins 19 and 20, and the rotary shaft 16 is regulated in the axial direction. There is a method of receiving the axial regulation by a bearing. If the regulation is carried out, here, however, adsorption easily occurs because the rotary shaft and the bearing are both made of soft magnetic materials. To make the magnetic circuit efficient, the rotary shaft and the bearing are preferably made contact with each other. The contact is made only in a radial direction in which a loss by adsorption is relatively small. In a thrust direction, preferably, contact is made by a nonmagnetic material because a loss is large.

The assembling of the stepping motor of Second Embodiment is as follows.

First, the first bearing 17 is fixed to the hole 12g of the first stator 12. The first outer magnetic pole portions 12a to 12d are inserted-into the first bobbin 19 on which the first coil 14 is wound along the position regulation grooves 19c, 19i, 19g and 19e provided in the bobbin 19. The process is similar for the stator 13. The magnet 11 fixed to the rotary shaft 16 is held between the two sets of stator units in the axial direction, and the first and second outer magnetic pole portions are assembled along the position regulation grooves disposed in the bobbins 19 and 20. Then, these portions are bonded and fixed when the upper end surfaces of the bobbin cylindrical portions 19b and 20b come into contact with each other.

Thus, as compared with the stepping motor (FIG. 14) disclosed in Japanese Patent Application Laid-Open No. 2003-009497, not only the positioning accuracy of the two sets of stators is higher, but also the motor case components can be reduced. Besides, insert molding by resins, which is necessary for the case of Japanese Patent Application Laid-Open No. 2003-70224 (FIG. 16), is not necessary. Thus, it is possible to provide the drive device of low component costs, simplified assembly, and high assembling accuracy.

In this stepping motor, as in the case of First Embodiment, the first coil 14 is disposed near the connected portion through the first bearing 17 between the outer cylindrical portion of the first stator 12 and the rotary shaft 16, and the magnet 11 is held between the first outer magnetic pole portions 12a to 12d of the first stator 12 and the inner magnetic pole portion 16a of the rotary shaft 16. The second coil 15 is disposed near the connected portion through the second bearing 18 between the outer cylindrical portion of the second stator 13 and the rotary shaft 16, and the magnet 11 is held between the outer magnetic pole portions 13a to 13d of the second stator 13 and the inner magnetic pole portion 16a of the rotary shaft 16. In other words, a structure is employed in which the first and second outer magnetic pole portions 12a to 12d and 13a to 13d face the outer peripheral surface of the magnet 11, the inner magnetic pole portion 16a is located in the inner peripheral surface of the magnet 11 to face the first outer magnetic pole portions 12a to 12d, and the second outer magnetic pole portions 13a to 13d similarly face the inner magnetic pole portion 16a.

Now, comparison will be made with the case of First Embodiment assuming that an axial length of the magnet 11 is A1. In First Embodiment, assuming that the number of magnet poles is 4×n, the number of first outer magnetic pole portions is 2×n, and a gap in the axial direction provided between the first and second stators is T1 (corresponding to T in FIG. 2), a facing length with respect to the magnet is (A1−T1)/2. Accordingly, while a total facing amount with respect to the magnet is n×(A1−T1) in First Embodiment, a total facing amount n×A1 in Second Embodiment which is larger than that in First Embodiment. Thus, the magnet can be used more effectively, realizing the stepping motor of a large output.

FIGS. 8A to 8D are sectional views taken along the line 7-7 of FIG. 5. Referring to these figures, drive of the stepping motor will be described.

Figure 8A:
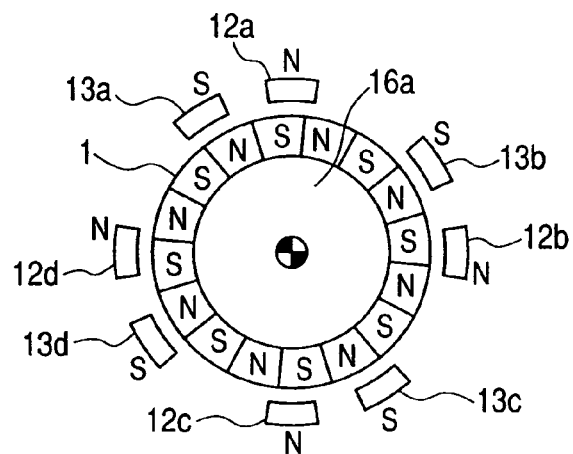
FIGS. 8A, 8B, 8C and 8D are sectional views taken along the line 7-7 for illustrating driving of the stepping motor of Second Embodiment of the present invention.
Figure 8B:
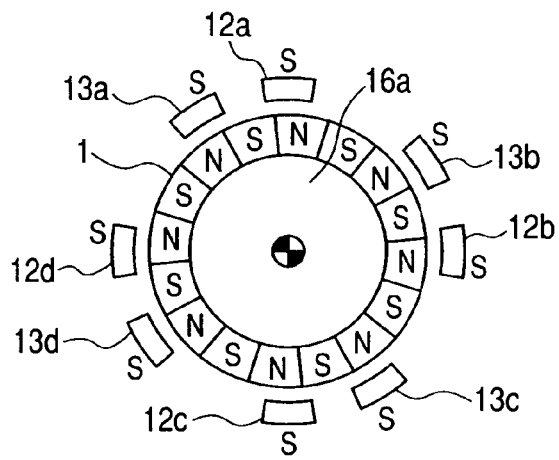
Figure 8C:
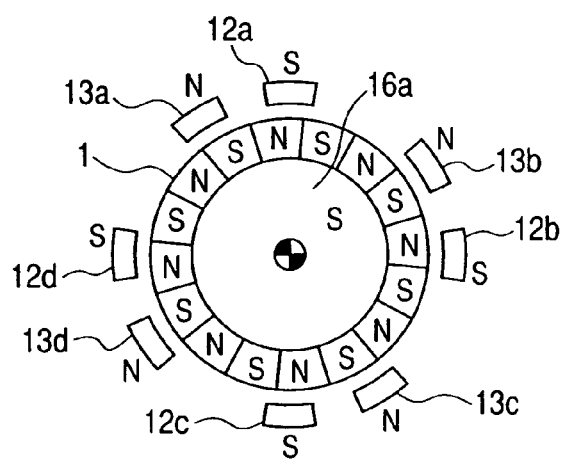

FIG. 8A shows a state in which the first and second coils 14 and 15 are energized to excite the first outer magnetic pole portions 12a to 12d to north poles and the second outer magnetic pole portions 13a to 13d to south poles. From the state shown in FIG. 8A, the energization of the first coil 14 is reversed to excite the first outer magnetic pole portions 12a to 12d to south poles while maintaining the second outer magnetic pole portions 13a to 13d excited to the south poles. Then, the magnet 11 is rotated counterclockwise by 11.25°, realizing a state shown in FIG. 8B. Next, the energization of the second coil 15 is reversed to excite the second outer magnetic pole portions 13a to 13d to north poles while maintaining the first outer magnetic pole portions 12a to 12d excited to the south poles. Then, the magnet 11 is further rotated counterclockwise by 11.25°, realizing a state shown in FIG. 8C. Next, the energization of the first coil 14 is reversed to excite the first outer magnetic pole portions 12a to 12d to north poles while maintaining the second outer magnetic pole portions 131a to 13d excited to the north poles.

Figure 8D:
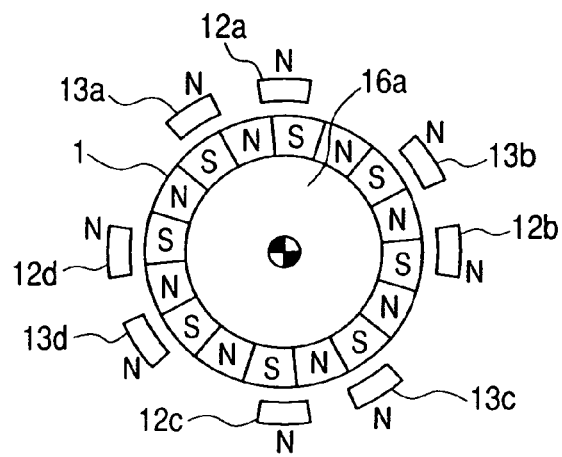

Then, the magnet 11 is further rotated counterclockwise by 11.25°, realizing a state shown in FIG. 8D.

Thereafter, by similarly switching the energization directions of the first and second coils 14 and 15 in sequence, the magnet 11 is rotated to positions sequentially in accordance with energization phases. In this case, if there is a relative position error between the first and second outer magnetic pole portions 12a to 12d and 13a to 13d, not only the obtained torque is not strong enough during rotation but also stopping accuracy is accordingly reduced, causing motor performance deterioration. As compared with a construction, in which a position error is large between first and second stators, in the stepping motor (FIG. 14) disclosed in Japanese Patent Application Laid-Open No. 2003-009497, the first and second stators 12 and 13 according to Second Embodiment are accurately aligned with each other, and thus such driving performance deterioration is small.

The stepping motor of the aforementioned construction has the following features.

A magnetic flux generated by the first coil 14 passes between the first outer magnetic pole portions 12a to 12d facing the outer peripheral surface of the magnet 11 and the inner magnetic pole portion 16a of the rotary shaft 16 fixed to the inner peripheral surface of the magnet 11. Accordingly, the magnetic flux is more effectively applied on the magnet 11 than the stepping motor (FIG. 14) disclosed in Japanese Patent Application Laid-Open No. 2003-009497. Similarly, a magnetic flux generated by the second coil 15 passes between the second outer magnetic pole portions 13a to 13d facing the outer peripheral surface of the magnet 11 and the inner magnetic pole portion 16b of the rotary shaft 16 fixed to the inner peripheral surface of the magnet 11. Accordingly, the magnetic flux is effectively applied on the magnet 11. In this case, no air gap is necessary between the inner magnetic pole portion 16a of the rotary shaft 16 facing the inner peripheral surface of the magnet 11 and the inner peripheral surface of the magnet 11. Thus, a distance between the outer and inner magnetic pole portions can be shortened, and magnetic resistance can be reduced, thereby increasing an output.

The inner magnetic pole portion 16a is integrally formed by one rotary shaft 16. Thus, as compared with the stepping motor in which the outer and inner magnetic pole portions are provided as separate components, manufacturing is easier, costs are lower, and assembling itself is easier. Additionally, since the rotary shaft 16 is fixed to the inner diameter portion of the magnet 11, not only the strength of the magnet 11 is high, but also magnetic deterioration of the magnet 11 is limited because the rotary shaft 16 works as a back metal.

Furthermore, since the axial length of the magnetic pole portion facing the magnet 11 can be set long, the outer magnetic pole portions 12a to 12d and 13a to 13d, the inner magnetic pole portion 16a, and the magnet 11 can be effectively used. Accordingly, it is possible to increase an output of the stepping motor.

As apparent from the foregoing, according to the stepping motor of First Embodiment, the components can be easily configured, and high performance and a high output are realized by positioning of higher accuracy while costs are low.

According to First and Second Embodiments, the output shaft fixed to the inner diameter portion of the magnet faces the first and second outer magnetic pole portions within the predetermined axial range of both, and the inner magnetic pole portions are formed to be excited by the first and second coils. Not limited to this construction, however, the output shaft may be a output shaft which faces at least one of the first and second outer magnetic pole portions within a predetermined axial range thereof and includes an inner magnetic pole portion which is formed to be excited by at least one of the first and second coils.

Third Embodiment

Figure 9:
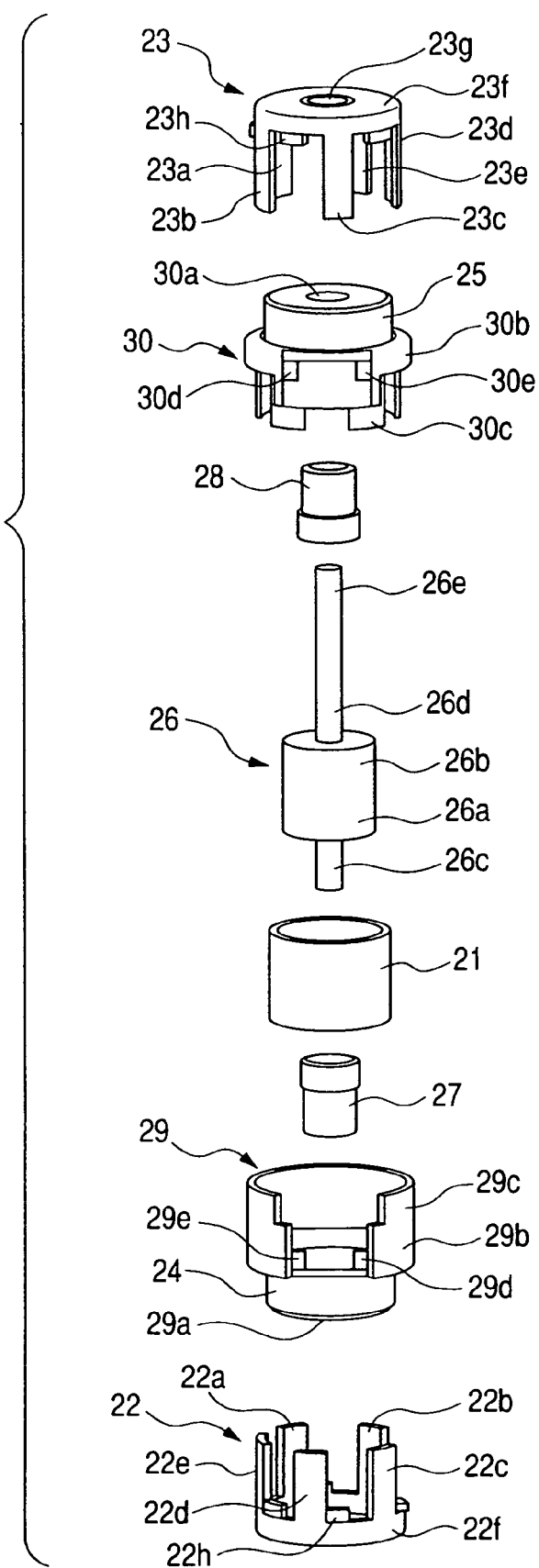
FIG. 9 is an exploded perspective view showing a construction of a stepping motor as a drive device according to an embodiment of the present invention.
Figure 10:
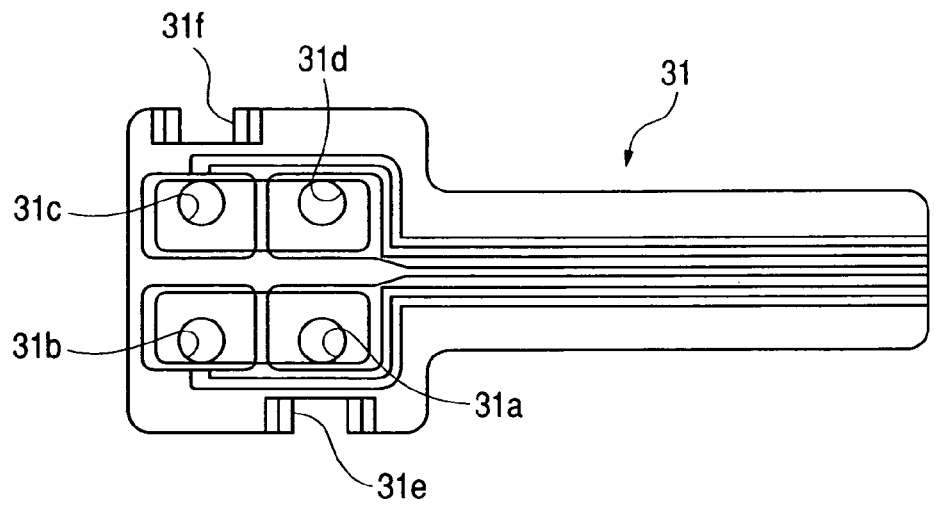
FIG. 10 is a plan view showing a construction of an FPC incorporated in the stepping motor.
Figure 11:
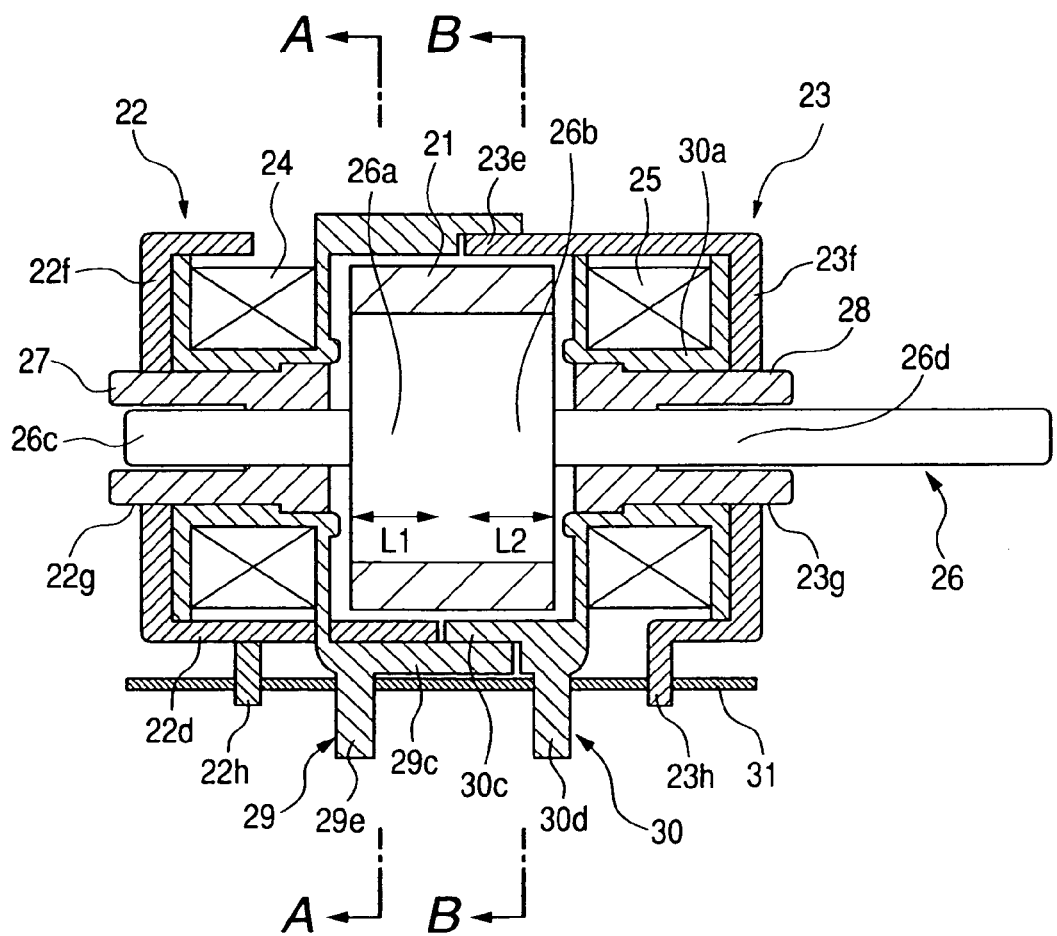
FIG. 11 is a sectional view showing a construction in a rotational axis direction in an assembling completed state of the stepping motor.

FIG. 9 is an exploded perspective view showing a construction of a stepping motor as a drive device according to Third Embodiment, FIG. 10 is a plan view showing a construction of an FPC incorporated in the stepping motor, and FIG. 11 is a sectional view showing a construction of the stepping motor in a rotational axis direction in an assembling completed state.

Referring to FIGS. 9 to 11, the stepping motor includes a magnet 21, first and second stators 22 and 23, first and second coils 24 and 25, a rotary shaft 26, first and second bearings 27 and 28, first and second bobbins 29 and 30, and an FPC 31.

The magnet 21 is formed into a cylindrical shape having its outer peripheral surface divided into N portions (divided into ten according to Third Embodiment) in a circumferential direction and a magnetization portion alternately magnetized to south and north poles.

The first stator 22 is made of a soft magnetic material and includes an outer cylindrical portion in which first outer magnetic pole portions 22a to 22e are formed, a doughnut-shaped top board 22f having a hole 22g bored in a center, and an engaging portion 22h. The first outer magnetic pole portions 22a to 22e are magnetic pole portions of comb-tooth shapes extending in an axial direction from the top board 22f, and formed at intervals of 720/N degrees (72° according to Third Embodiment) in the circumferential direction. The engaging portion 22h is extended from a notch between the comb-tooth portions (the first outer magnetic pole portions) to the outside of the outer cylindrical portion, and engaged with an engaging portion 31e formed in the FPC 31 (described later).

The second stator 23 is made of a soft magnetic material, and includes an outer cylindrical portion in which second outer magnetic pole portions 23a to 23e are formed, a doughnut-shaped top board 23f having a hole 23g bored in a center, and an engaging portion 23h. The second outer magnetic pole portions 23a to 23e are magnetic pole portions of comb-tooth shapes extending in the axial direction from the top board 23f, and formed at intervals of 720/N degrees (72° according to Third Embodiment) in the circumferential direction. The engaging portion 23h is extended from a notch between the comb-tooth portions (second outer magnetic pole portions) to the outside of the outer cylindrical portion, and engaged with an engaging portion 31f formed in the FPC 31 (described later).

The first and second outer magnetic pole portions 22a to 22e and 23a to 23e of the first and second stators 22 and 23 are formed into the comb-tooth shapes extending in the axial direction. Thus, a magnetic pole portion can be formed while limiting a diameter of the stepping motor to a minimum.

If the outer magnetic pole portions are formed into concave and convex shapes extending in a radial direction of the outer cylindrical portion, the diameter of the stepping motor is accordingly increased. According to Third Embodiment, however, the first and second outer magnetic pole portions 22a to 22e and 23a to 23e are formed into the comb-tooth shapes extending in the axial direction, and thus an outer diameter of the stepping motor can be limited to a minimum. Moreover, a structure in which the engaging portions 22h and 23h of the first and second stators 22 and 23 extend in the radial direction of the outer cylindrical portion between the outer magnetic pole portions facilitates formation.

The first coil 24 is formed into a cylindrical shape, and wound on the first bobbin 29. A coil terminal of the first coil 24 is wound on terminal pins 29d and 29e of the first bobbin 29 (described later). An outer diameter of the first coil 24 is almost equal to that of the magnet 21.

The second coil 25 is formed into a cylindrical shape, and wound on the second bobbin 30. A coil terminal of the second coil 25 is wound on terminal pins 30d and 30e of the second bobbin 30 (described later). An outer diameter of the second coil 25 is almost equal to that of the magnet 21.

The rotary shaft 26 is made of a soft magnetic material, and includes first and second inner magnetic pole portions 26a and 26b, insertion portions 26c and 26d, and an output portion 26e. The insertion portions 26c and 26d of the rotary shaft 26 are respectively inserted into inner diameter portions of the first and second coils 24 and 25, and the first and second inner magnetic pole portions 26a and 26b are fixed to an inner diameter portion of the magnet 21 by adhesives.

The first inner magnetic pole portion 26a of the rotary shaft 26 is formed within an axial range facing the first outer magnetic pole portions 22a to 22e of the first stator 22 opposed to the magnet 21 and a range (range indicated by an arrow L1 in FIG. 11) sandwiching the magnet 21. The first inner magnetic pole portion 26a is excited to a pole opposed to that of the first outer magnetic pole portions 22a to 22e of the first stator 22 by energizing the first coil 24.

Similarly, the second inner magnetic pole portion 26b of the rotary shaft 26 is formed within an axial range facing the second outer magnetic pole portions 23a to 23e of the second stator 23 opposed to the magnet 21 and a range (range indicated by an arrow L2 in FIG. 11) sandwiching the magnet 21. The second inner magnetic pole portion 26b is excited to a pole opposed to that of the second outer magnetic pole portions 23a to 23e of the second stator 23 by energizing the second coil 25.

A structure is employed in which the magnet 21 is fixed to the outer peripheral portions of the first and second inner magnetic pole portions 26a and 26b of the rotary shaft 26. In other words, a structure is employed in which an inner diameter portion of the magnet 21 is filled with the first and second inner magnetic pole portions 26a and 26b. Thus, mechanical strength of the magnet 21 is increased. The first inner magnetic pole portion 26a of the rotary shaft 26 works as a back metal, and a permeance modulus of the magnetic circuit is set high, whereby magnetic deterioration caused by demagnetization is reduced even when the stepping motor is used in a high-temperature environment.

The first bearing 27 is made of a soft magnetic material, and fixed to the hole 22g of the first stator 22. Accordingly, the first bearing 27 and the first stator 22 are magnetically connected to each other. An inner diameter portion of the first bearing 27 is fitted to the insertion portion 26c of the rotary shaft 26 to rotatably hold the rotary shaft 26.

Accordingly, the first bearing 27 and the rotary shaft 26 are magnetically connected to each other in this fitted portion, and the first bearing 27 operates as a part of the first inner magnetic pole portion. With this construction, the first stator 22 and the rotary shaft 26 are magnetically connected to each other through the first bearing 27, but a flow of the magnetic flux generated by the first coil 24 is facilitated because of small magnetic resistance in this case.

The second bearing 28 is made of a soft magnetic material, and fixed to the hole 23g of the second stator 23. Accordingly, the second-bearing 28 and the second stator 23 are magnetically connected to each other. An inner diameter portion of the second bearing 28 is fitted to the insertion portion 26d of the rotary shaft 26 to rotatably hold the rotary shaft 26.

Accordingly, the second bearing 28 and the rotary shaft 26 are magnetically connected to each other in this fitting portion, and the second baring 28 operates as a part of the second inner magnetic pole portion. With this construction, the second stator 23 and the rotary shaft 26 are magnetically connected to each other through the second bearing 28. A flow of a magnetic flux generated by the second coil 25 is facilitated because of small magnetic resistance in this case.

The first bobbin 29 is formed by resin molding, and includes a cylindrical portion 29a, a cover 29b, a fitting portion 29c, and terminal pins 29d and 29e. The first coil 24 is wound on an outer periphery of the cylindrical portion 29a of the first bobbin 29. The cylindrical cover 29b is formed to extend in the axial direction from one outer peripheral edge of the first bobbin 29, and the fitting portion 29c is integrally formed on a tip side of the cover 29b. The fitting portion 29c of the first bobbin 29 is fitted to a fitting portion 30c of the second bobbin 30.

The cover 29b is configured so that its inner peripheral wall is disposed outside the first outer magnetic pole portions 22a to 22e of the first stator 22 to avoid interference therewith, and protects the first outer magnetic pole portions 22a to 22e from deformation. The terminal pins 29d and 29e are integrally formed in parts of the cover 29b, and a coil terminal of the first coil 24 is wound on the terminal pins 29d and 29e.

The second bobbin 30 is formed by resin molding, and includes a cylindrical portion 30a, a cover 30b, a fitting portion 30c, and terminal pins 30d and 30e. The second coil 25 is wound on an outer periphery of the cylindrical portion 30a of the second bobbin 30. The cylindrical cover 30b is formed to extend in the axial direction from one outer peripheral edge of the second bobbin 30, and the fitting portion 30c is integrally formed on a tip side of the cover 30b. The fitting portion 30c of the second bobbin 30 is fitted to the fitting portion 29c of the first bobbin 29.

The cover 30b is configured so that its inner peripheral wall is disposed outside the second outer magnetic pole portions 23a to 23e of the second stator 23 to avoid interference therewith, and protects the second outer magnetic pole portions 23a to 23e from deformation. The terminal pins 30d and 30e are integrally formed in parts of the cover 30b, and a coil terminal of the second coil 25 is wound on the terminal pins 30d and 30e.

The first and second bobbins 29 and 30 are assembled by respectively fitting to the fitting portions 29c and 30c. The first and second bobbins 29 and 30 are arranged in positions where they axially overlap the magnet 21 by the covers 29b and 30b, respectively. Accordingly, deformation of the magnet 21, and the first and second outer magnetic pole portions 22a to 22e and 23a to 23e of the first and second stators 22 and 23 due to an external force is prevented, and intrusion of dusts or the like from the outside is prevented.

The first and second terminal pins 29d and 29e and 30d and 30e of the first and second bobbins 29 and 30 are formed integrally to extend radially with respect to the covers 29b and 30b, respectively. Thus, manufacturing and assembling are easy, and costs can be reduced.

According to Japanese Patent Application Laid-Open No. 2003-070224 (FIG. 16), the stepping motor employs the structure in which the terminal base and the terminal pin both protrude from its outer peripheral portion. On the other hand, according to this Embodiment, the stepping motor can be miniaturized because the terminal base portion is unnecessary.

Furthermore, according to Japanese Patent Application Laid-Open No. 2003-070244 (FIG. 16), the force applied on the terminal base is received by a part of the thin flange of the bobbin, and thus the structure is very weak to an external force. On the other hand, according to this embodiment, the first and second terminal pins 29d and 29e and 30d and 30e of the first and second bobbins 29 and 30 protrude from parts of the cylindrical covers 29b and 30b, respectively. Thus, there is an advantage that strength is high and destruction does not readily occur even when loads are applied on the terminal pins.

The FPC 31 is a substrate on which a power supply circuit or the like for feeding power to the coils is mounted, and includes four holes 31a to 31d, and engaging portions 31e and 31f. The holes 31a to 31d of the FPC 31 are set to such sizes and pitches that allow insertion of the terminal pins 29d and 29e and 30d and 30e of the first and second bobbins 29 and 30. By soldering the terminal pins 29d, 29e, 30d and 30e to the holes 31a to 31d of the FPC 31, the FPC 31 and the first and second coils 24 and 25 are electrically connected to each other.

The engaging portion 31e of the FPC 31 is formed in a state in which one end of the FPC 31 in a width direction is notched, and is engaged with the engaging portion 22h of the first stator 22 and fixed by soldering. The engaging portion 31f of the FPC 31 is formed in a state in which the other end of the FPC 31 in the width direction is notched, and is engaged with the engaging portion 23h of the second stator 23 and fixed by soldering. In other words, the FPC 31 is firmly fixed to the first and second stators 22 and 23. Accordingly, even when an external force is applied to the FPC 31, it is possible to avoid being applied any loads on the terminal pins 29d and 29e and 30d and 30d of the first and second bobbins 29 and 30, whereby to prevent problems such as destruction of the terminal pins and breakage of the soldered contact portions.

The first and second stators 22 and 23 are fixed by the FPC 31, and thus it is not necessary to fix the first and second stators 22 and 23 to a case or the like. Moreover, the FPC 31 and the first and second stators 22 and 23 are fixed to each other by soldering. Thus, the fixing is easily performed.

Furthermore, relative positions of the first and second stators 22 and 23 in the rotational direction of the magnet 21 are set to establish a predetermined relative positional relation. According to Japanese Patent Application Laid-Open No. 2003-070224 (FIG. 16), after fitting the bobbins and the stators in predetermined positions, the bobbins are fixed to predetermined positions together. Thus, as for the positional relation between the stators, position accuracy is difficult to achieve because of accumulation of tolerances.

On the other hand, according to this embodiment, a predetermined relative positional relation is directly established between the first and second stators 22 and 23 through the FPC 31. Accordingly, high relative position accuracy is achieved between the first and second stators 22 and 23. As a result, it is possible to realize a stepping motor with high rotational performance.

Next, a mechanism for rotationally driving the stepping motor of this embodiment will be described in detail with reference to FIGS. 12A to 12D and 13A to 13D.

FIGS. 12A to 12D are sectional views taken along the line A-A of FIG. 11, and FIGS. 13A to 13D are sectional views taken along the line B-B of FIG. 11.

In FIGS. 12A to 12D and FIGS. 13A to 13D, FIGS. 12A and 13A, FIGS. 12B and 13B, FIGS. 1-2C and 13C, and FIGS. 12D and 13D show similar timing states during rotation of the stepping motor.

Figure 12A:
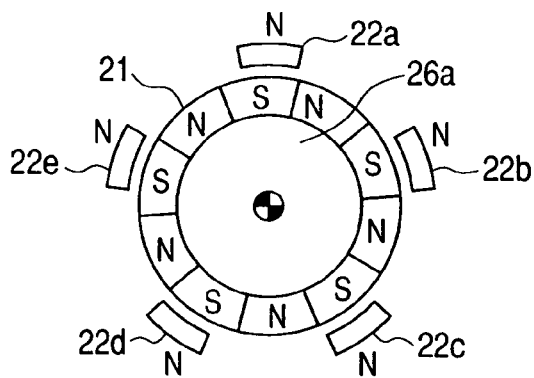
FIGS. 12A, 12B, 12C and 12D are sectional views taken along the line A-A of FIG. 11.
Figure 12B:
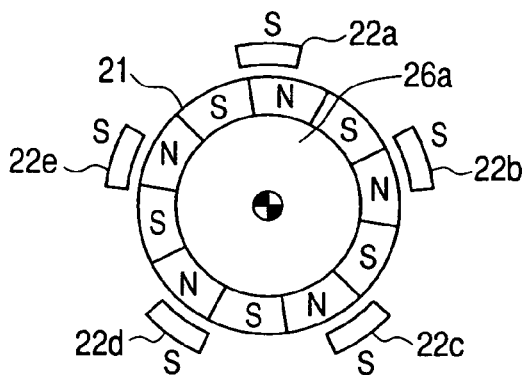
Figure 12C:
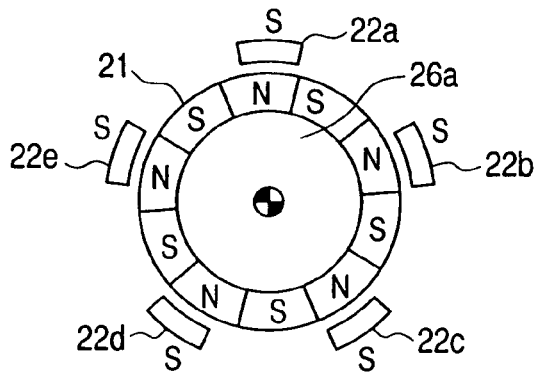
Figure 12D:
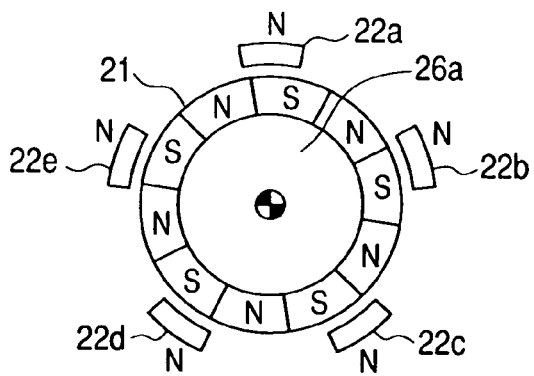
Figure 13A:
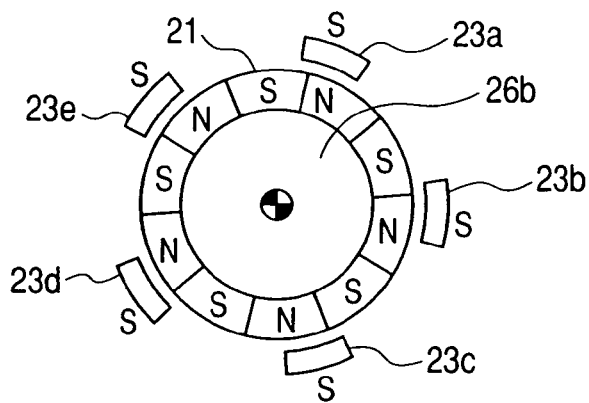
FIGS. 13A, 13B, 13C and 13D are sectional views taken along the line B-B of FIG. 11.
Figure 13B:
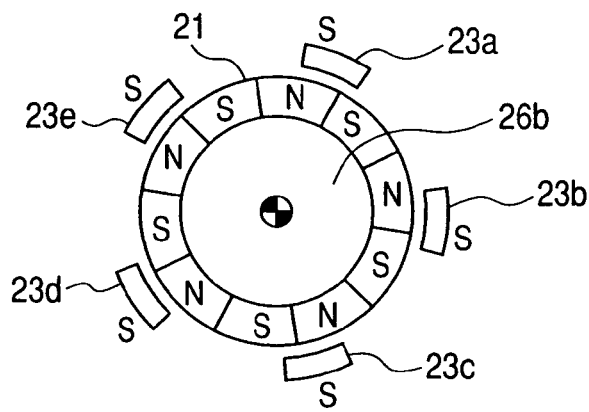
Figure 13C:
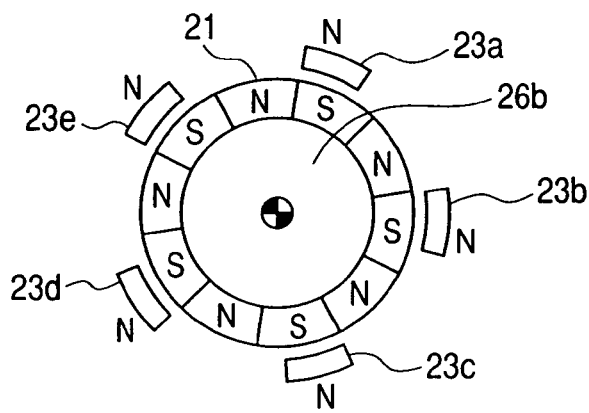
Figure 13D:
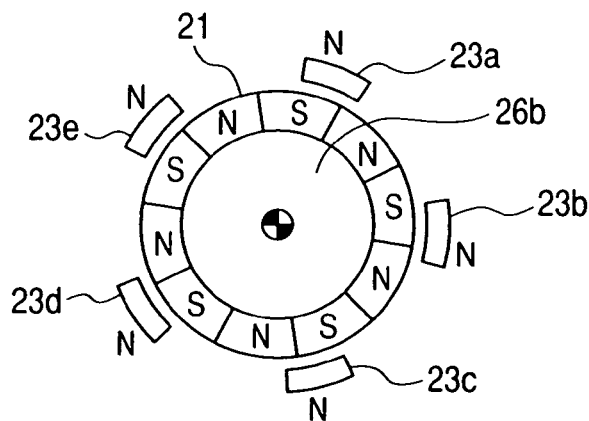

A state of the magnet 21 in FIG. 12A shows a case in which the first and second coils 24 and 25 are energized to excite the first outer magnetic pole portions 22a to 22e of the first stator 22 to north poles and the second outer magnetic pole portions 23a to 23e of the second stator 23 to south poles.

From this state, the energization of the first coil 24 is reversed to excite the first outer magnetic pole portions 22a to 22e of the first stator 22 to south poles and the second outer magnetic pole portions 23a to 23e of the second stator 23 to south poles. Then, the magnet 21 that is a rotor is rotated counterclockwise by 18°, realizing a state shown in FIG. 12B.

Next, the energization of the second coil 25 is reversed to excite the first outer magnetic pole portions 22a to 22e of the first stator 22 to south poles and the second outer magnetic pole portions 23a to 23e of the second stator 23 to north poles. Then, the magnet 21 is further rotated counterclockwise by 18°, realizing a state shown in FIG. 12C.

Next, the energization of the first coil 24 is reversed to excite the first outer magnetic pole portions 22a to 22e of the first stator 22 to north poles and the second outer-magnetic pole portions 23a to 23e to north poles. Then, the magnet 21 is further rotated counterclockwise by 18°, realizing a state shown in FIG. 12D.

Next, the energization of the second coil 25 is reversed to excite the first outer magnetic pole portions 22a to 22e of the first stator 22 to north poles and the second outer magnetic pole portions 23a to 23e of the second stator 23 to south poles. Then, the magnet 21 is further rotated counterclockwise by 18°, returning to the state of FIG. 12A again.

Thereafter, by similarly switching the energization directions of the first and second coils 24 and 25 in sequence, the magnet 21 is sequentially rotated to positions corresponding to energization phases.

According to this embodiment, magnetic fluxes generated by energizing the first and second coils 24 and 25 are directly applied on the magnet 21, and the structure unique to this embodiment described above in detail is employed. Thus, an output of the stepping motor can be high, and the motor can be greatly miniaturized.

That is, a diameter of the stepping motor only needs to be a size for opposing the magnetic poles of the first and second stators 22 and 23 to a diameter of the magnet 21, and a length of the stepping motor only needs to be equal to the addition of lengths of the first and second coils 24 and 25 to a length of the magnet 21. Thus, a size of the stepping motor is defined by the diameters and lengths of the magnet and the coils. By setting the diameters and lengths of the magnet and the coils very small, it is possible to realize a subminiature stepping motor.

As described above, according to this embodiment, since the structure is employed in which the engaging portions 22h and 23h are respectively arranged in the first and second stators 22 and 23, respectively, and the first and second stators 22 and 23 are fixed to the FPC 31 for feeding power to the coils through the engaging portions, the FPC 31 can be fixed by sufficient strength. Thus, it is possible to prevent problems such as destruction of the FPC 31 itself and cutting-off of a connection portion between the FPC 31 and the coil even when an external force is applied to the FPC 31, thereby providing a highly reliable stepping motor. Moreover, the first and second stators 22 and 23 can be easily positioned in the rotational axis direction, the assembly can be facilitated, and low costs can be achieved.

The first and second stators 22 and 23 and the FPC 31 are fixed so that a predetermined positional relation can be established between relative positions of the first and second stators 22 and 23 in the rotational direction of the magnet 21. Thus, high relative position accuracy between the first and second stators 22 and 23 can be realized, thereby providing a stepping motor with high rotation performance.

The first and second stators 22 and 23 and the FPC 31 are fixed by soldering, and thus the fixing is easy.

The first and second outer magnetic pole portions 22a to 22e and 23a to 23e of the first and second stators 22 and 23 are formed into the axially extending comb-tooth shapes. Thus, a motor outer diameter can be minimized, making it possible to miniaturize the stepping motor.

Furthermore, the terminal pins 29d and 29e are disposed in the cover 29b axially extending from the cylindrical portion 29a of the first bobbin 29, and the terminal pins 30d and 30e are disposed in the cover 30b axially extending from the cylindrical portion 30a of the second bobbin 30. Thus, as compared with a stepping motor having the conventional structure in which the terminal base and the terminal pin protrude in the radial direction of the outer-diameter portion, an outer diameter can be minimized, making it possible to miniaturize the stepping motor.

Other Embodiments

According to Third Embodiment described above, the engaging portions 31e and 31f of the FPC 31 respectively engaged with the engaging portions 22h and 23h of the first and second stators 22 and 23 are formed by notching both ends of the FPC 31 in the width direction. However, the present invention is not limited to this. Any shape can be selected as long as the FPC 31 can be firmly fixed to the first and second stators 22 and 23. For example, the engaging portions disposed in the FPC 31 may be formed as holes engageable with the engaging portions 22h and 23h of the first and second stators 22 and 23.

This application claims priorities from Japanese Patent Application Nos. 2004-125276 filed on Apr. 21, 2004 and 2005-027869 filed on Feb. 3, 2005, which are hereby incorporated by reference herein.

What is claimed is:

1. A stepping motor, comprising:
a rotatable cylindrical magnet circumferentially divided to be alternately magnetized with different magnetic poles;
a first cylindrical coil and a second cylindrical coil disposed in positions where the first cylindrical coil and the second cylindrical coil are concentric with the magnet and axially hold the magnet therebetween;
a first stator having a first outer magnetic pole portion axially extending to face one outer peripheral surface side of the magnet at a predetermined interval and excited by the first coil;
a second stator having a second outer magnetic pole portion axially extending to face the other outer peripheral surface side of the magnet and excited by the second coil;
an output shaft having an inner magnetic pole portion made of a soft magnetic material and fixed to an inner diameter portion of the magnet, the inner magnetic pole portion facing at least one of the first outer magnetic pole portion and the second outer magnetic pole portion within a predetermined axial range and excited by at least one of the first coil and the second coil; and
a cylindrical bobbin made of an insulator on which at least one of the first coil and the second coil is wound,
wherein the bobbin includes an engaging portion engaged with the axially extending first magnetic pole portion and the axially extending second magnetic pole portion such that a predetermined positional relation is established between relative circumferential positions of the first stator and the second stator.

2. A stepping motor, comprising:
a rotatable cylindrical magnet circumferentially divided to be alternately magnetized with different magnetic poles;
a first cylindrical coil and a second cylindrical coil disposed in positions where the first cylindrical coil and the second cylindrical coil are concentric with the magnet and axially hold the magnet therebetween;
a first stator having a first outer magnetic pole portion axially extending to face one outer peripheral surface side of the magnet at a predetermined interval and excited by the first coil;
a second stator having a second outer magnetic pole portion axially extending to face the other outer peripheral surface side of the magnet at a predetermined interval and excited by the second coil;
an output shaft having an inner magnetic pole portion made of a soft magnetic material and fixed to an inner diameter portion of the magnet, the inner magnetic pole portion facing at least one of the first outer magnetic pole portion and the second outer magnetic pole portion within a predetermined axial range and excited by at least one of the first coil and the second coil; and
a cylindrical bobbin made of an insulator on which at least one of the first coil and the second coil is wound,
wherein the bobbin includes an engaging portion engaged with the axially extending first magnetic pole portion and the axially extending second magnetic pole portion such that a predetermined positional relation is established between relative circumferential positions of the first stator and the second stator, and a cover that covers outer peripheral sides of the first stator, the second stator, and the magnet.

3. A drive device, comprising:
a magnetized cylindrical magnet;
a rotary shaft fixed to an inner diameter portion of the magnet;
a first coil disposed on one axial side of the magnet to be coaxial with the magnet;
a second coil disposed on the other axial side of the magnetic to be coaxial with the magnet;
a first stator disposed to face an outer peripheral surface of the magnet and excited by the first coil; and
a second stator disposed to face the outer peripheral surface of the magnet and excited by the second coil,
wherein the first stator and the second stator each include an engaging portion, and wherein the first stator and the second stator, and a substrate for feeding power to the first coil and the second coil, are fixed to each other through the engaging portion.

4. A drive device according to claim 3, wherein the first stator and the second stator, and the substrate, are fixed to each other such that a predetermined positional relation is established between relative positions of the first stator and the second stator with respect to a rotational direction of the magnet.

5. A drive device according to claim 3, wherein a method of fixing the first stator and the second stator to the substrate comprises soldering.

6. A drive device according to claim 3, wherein:
the first stator includes a first outer magnetic pole portion of a comb-tooth shape axially extending to face an outer peripheral surface on one axial end surface side of the magnet;
the second stator includes a second outer magnetic pole portion of a comb-tooth shape axially extending to face an outer peripheral surface on the other axial end surface side of the magnet; and the rotary shaft includes a first inner magnetic pole portion facing the first outer magnetic pole portion with the magnet therebetween, and a second inner magnetic pole portion facing the second outer magnetic pole portion with the magnet therebetween.

7. A drive device according to claim 3, further comprising:
a first bobbin on which the first coil is wound; and
a second bobbin on which the second coil is wound,
wherein the first bobbin includes a terminal pin for connecting a terminal of the first coil, the terminal pin being disposed in a portion axially extending from the coil wound portion, and
wherein the second bobbin includes a terminal pin for connecting a terminal of the second coil, the terminal pin being disposed in a portion axially extending from the coil wound portion.

8. A drive device according to claim 3, wherein energization directions to the first coil and the second coil are sequentially switched, and the magnet is sequentially rotated to positions corresponding to energization phases.

\* \* \* \* \*